US010255199B1

(12) United States Patent
Zmudzinski et al.

(10) Patent No.: US 10,255,199 B1
(45) Date of Patent: Apr. 9, 2019

(54) EVICTING CLEAN SECURE PAGES WITHOUT ENCRYPTION

(71) Applicant: Intel Corporation, Santa Clara, CA (US)

(72) Inventors: Krystof C. Zmudzinski, Forest Grove, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/712,968

(22) Filed: Sep. 22, 2017

(51) Int. Cl.
*G06F 12/10* (2016.01)
*G06F 12/126* (2016.01)
*G06F 12/128* (2016.01)
*G06F 3/06* (2006.01)
*G06F 12/0831* (2016.01)

(52) U.S. Cl.
CPC ............ *G06F 12/126* (2013.01); *G06F 3/065* (2013.01); *G06F 3/0652* (2013.01); *G06F 12/128* (2013.01); *G06F 3/0655* (2013.01); *G06F 12/0833* (2013.01)

(58) Field of Classification Search
USPC ........................................................ 711/133
See application file for complete search history.

(56) References Cited

U.S. PATENT DOCUMENTS

2011/0153944 A1* 6/2011 Kursawe ............. G06F 12/0802
711/122

OTHER PUBLICATIONS

Victor Costan and Srinivas Devadas "Intel SGX Explained" received Jan. 30, 2016, pp. 1-118.

* cited by examiner

*Primary Examiner* — Jae U Yu
(74) *Attorney, Agent, or Firm* — Lowenstein Sandler LLP

(57) ABSTRACT

Secure memory paging technologies are described. Embodiments of the disclosure may include checking attributes of secure page cache map to determine whether a target page to be evicted is clean and replay protected by a unified version-paging data structure and checking the unified version-paging data structure to determine whether contents of the unified version-paging data structure match the target page. When the target page to be evicted is clean and replay protected and the contents match, the target page can be removed without encrypting the contents of the target page.

20 Claims, 23 Drawing Sheets

EPCM 800

| # | C | RP | Description |
|---|---|----|-------------|
| 1 | 0 | 0  | Legacy |
| 2 | 0 | 1  | Dirty RP page |
| 3 | 1 | 0  | #MC |
| 4 | 1 | 1  | Clean RP page |

FIG. 8A

UMDS 850

| # | C | RP | Description |
|---|---|----|-------------|
| 1 | 0 | 0  | Legacy |
| 2 | 0 | 1  | Dirty RP page |
| 3 | 1 | 0  | Replay-protected UMDS |
| 4 | 1 | 1  | Clean RP page |

EVICTING CLEAN SECURE PAGES WITHOUT ENCRYPTION

BACKGROUND

Modern processors are designed to protect sensitive data in memory from both hardware and software attacks. Some processors provide cryptographic mechanisms for encryption, integrity, and replay protection. Memory encryption protects the confidentiality of memory-resident data. On the other hand, integrity protection prevents an attacker from causing any hidden modifications to the ciphertext (i.e., encrypted data, as opposed to plaintext which is unencrypted data) in memory, and replay protection eliminates any undetected temporal substitution of the ciphertext. In the absence of such protections, an attacker with physical access to the system can record snapshots of data lines and replay them at a later point in time.

BRIEF DESCRIPTION OF THE DRAWINGS

FIG. 8A is a table that shows a clean attribute and a replay-protected attribute that can be stored in bits of an Enclave Page Cache Map (EPCM) used to track EPC pages in an EPC according to one embodiment.

FIG. 8B is a table 850 that shows a clean attribute and a replay-protected attribute that can be stored in bits of a Unified Meta-Data Structure (UMDS) used to restore encrypted pages to the EPC according to one embodiment.

DETAILED DESCRIPTION

Figure 1:
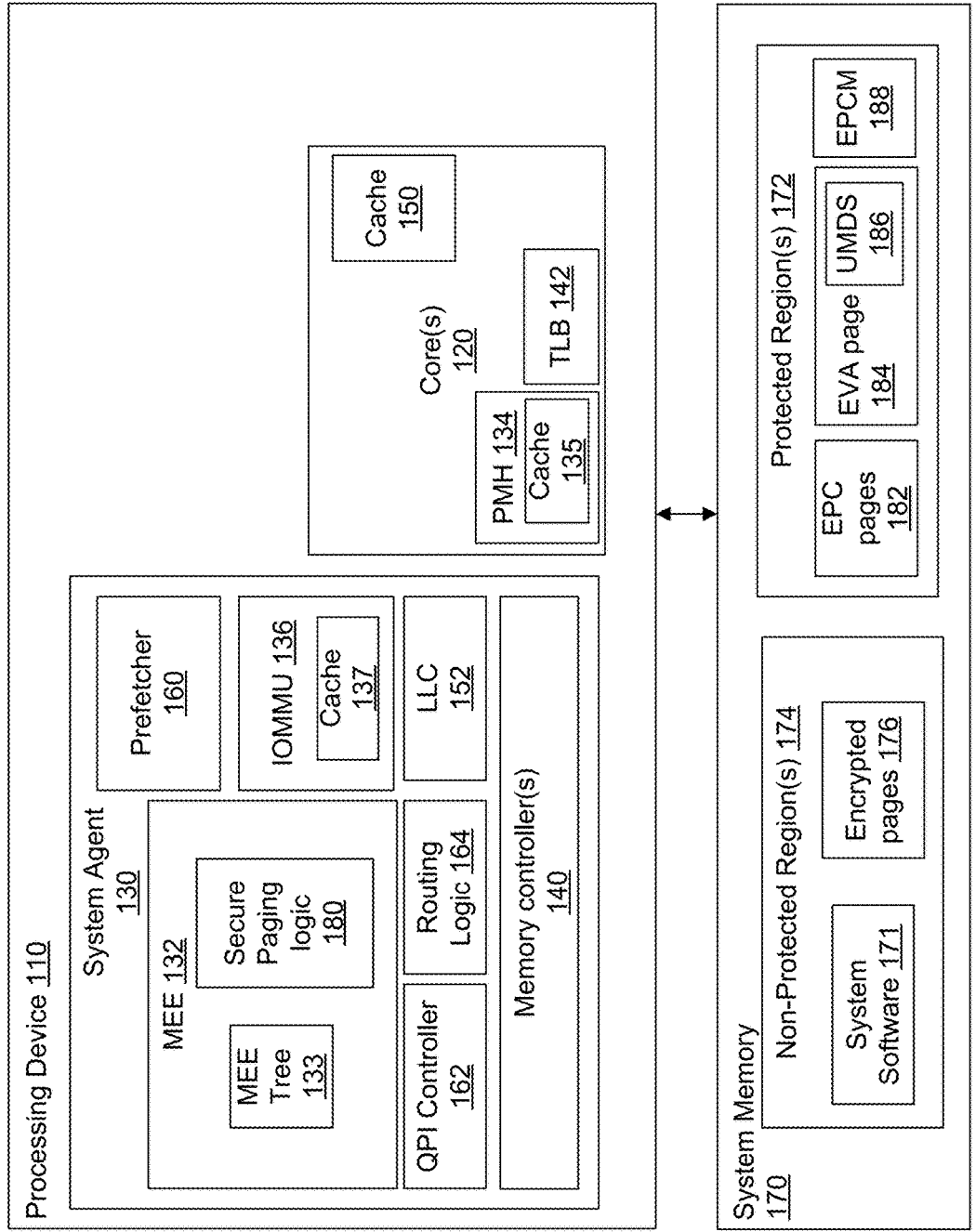
FIG. 1 is a block diagram illustrating a computing system for implementing secure memory paging according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Secure memory paging technologies are described herein. Secure memory paging technologies are described. Embodiments of the disclosure may include checking attributes of a secure page cache map (e.g., enclave page cache map (EPCM)) to determine whether a target page to be evicted is clean and replay protected by a unified version-paging data structure (e.g., unified meta-data structure (UMDS)) and checking the unified version-paging data structure to determine whether the unified version-paging data structure contains information that matches the target page. When the target page to be evicted is clean and replay protected and the contents of the unified version-paging data structure matches the target page, the target page can be removed without encrypting the contents of the target page. In particular, described herein are various embodiments for evicting and loading pages in a secure container, referred to herein as "enclaves," "secure enclaves," or "EPC." In one embodiment, a processing device includes a processor core and a memory controller coupled between the processor core and a memory device. The processor core, in response to an extended secure write back (EWBE) instruction to evict a target page from a protected region of memory into a non-protected region of the memory: 1) checks a first attribute of a EPCM to determine whether the target page is clean (not dirty); 2) checks a second attribute of the EPCM to determine whether the target page is replay protected by the unified version-paging data structure, the unified version-paging data structure being stored in the protected region and including version meta-data corresponding to the target page and page meta-data to restore the target page to the protected region; 3) checking the unified version-paging data structure to determine whether the unified version-paging data structure contains information that matches the target page; and 3) removes the target page from the protected region of memory without encrypting the contents of the target page when the first attribute indicates that the target page is clean and the target page is replay protected by the unified version-paging data structure. System software system software (e.g., OS or VMM) executing on the processing device can load, evict, and restore pages in and out of the protected region as described herein. For example, if the OS needs to evict a secure page from the protected region, the OS executes the EWBE instruction, as described herein. If the OS needs to restore an encrypted page stored in a non-protected region to the protected region, the OS executes the ELDE instruction, as described herein.

In another embodiment, the UMDS extensions can include a new type of version array called Restricted EVA or EVA and change the operations of the EWBE and ELDE instructions. EVA pages and evicted pages belong to the same enclave and they have the same parent SECS. REVA slots are used to store UMDS instances describing evicted pages of the same enclave. Several things have to be true before a page is evicted without a new encrypted copy being generated. The page must be clean and replay-protected. These attributes reside in EPCM. The UMDS must be replay-protected and must reside in a REVA page that belongs to the same enclave as the target page and a linear address in the UMDS matches a linear address in the EPCM entry that describes the target page. If the page is dirty a new encrypted copy will be generated and UMDS replaced. On the other hand, even if the page is clean but the UMDS doesn't match or is invalid, also a new encrypted copy will be generated.

Memory encryption protects the confidentiality of memory-resident data. Memory encryption is primarily designed to protect against passive attacks where an attacker tries to silently observe the data lines as the data lines move on and off the processing device die. Some processing devices include an encryption module that encrypts sensitive data before the data is stored into a protected region of the memory. On a memory read to the protected region, the data line is decrypted before being fed into the processing device. The encryption and decryption algorithms can be chosen based on the security level required by the user. In various embodiments described herein, the secure memory paging can be performed with respect to secure containers, referred to herein as Secure Enclaves (SEs) or just "enclave." The system software (OS or VMM) may create one or more SEs in a protected region of memory. The SEs are designed to protect third-party secrets from both hardware and software attacks. SE can protect the confidentiality of enclave secrets by ensuring that the enclave secrets are stored encrypted when resident in platform memory. In order to provide complete protection from hardware attacks, SEs provide integrity protection and replay protection. In the absence of such protections, an attacker with physical access to the system can record snapshots of enclave cache lines and replay them at a later point in time. In order to achieve these protections, SE employs a memory encryption engine (MEE), which provides cryptographic mechanisms for encryption, integrity, and replay protection. The MEE is a hardware unit that implements the cryptographic functionality to secure pages when they are in memory. More specifically, the MEE can encrypt any cache line that gets evicted out of the processing device if it belongs to a secure page and the MEE also provides integrity protection and replay-protection for the secure pages. The MEE may reserve a range of platform memory statically at boot time and enforce the cryptographic protections on this range of memory. This secure memory range may be referred to as the Enclave Page Cache (EPC) and may include an integrity and replay-protection tree that the MEE uses to secure EPC pages. EPC pages may refer to secure pages that are encrypted and integrity protected by the MEE. Enclave memory requests are satisfied from the EPC.

One processor extension, referred to as SGX, provides instructions to enable an operating system (OS) (or VMM) to manage an oversubscription of the EPC. A secure write back instructions, EWB, evicts an EPC page and writes it to main memory. The evicted EPC page can be reloaded back into the enclave from which it was evicted using secure load instruction, ELDU or ELDB. Just as EPC pages are protected from replay while inside the EPC, it is necessary for an enclave paging mechanism (e.g., SGX paging mechanism) to afford the same protections. To achieve this, an EPC page is assigned a unique version number as it is evicted; when the page is reloaded, that version is checked to ensure that it is the same as when the EPC page was last evicted. The version of each evicted EPC page is stored in special Version Arrays (VA) in the EPC to protect it. As the EPC page is moved to main memory, its contents are encrypted and the encrypted contents, security attributes and version can be applied to a secure hashing function, such as a message-authentication code (MAC) function (also referred to herein as "MACed"). When the EPC page is loaded back to EPC from main memory, the version is used to decrypt the page and verify the MAC; the version is then destroyed so the encrypted copy cannot be used again to mount a replay attack. This applies to all EPC pages even when they are not dirty (i.e., PTE.D=0) when the OS decides to evict them from the EPC. This makes eviction of enclave pages much more expensive than regular non-EPC pages that can be simply discarded and then reloaded from the original source. As described herein, the EWB, ELD (ELDU/ELDB) instructions are considered legacy instructions with respect to the extended instructions described herein, including EWBE and ELDE. Embodiments of the extended SGX paging architecture, as described herein, may reduce a latency of evicting clean enclave pages to be close to that of evicting clean, non-enclave pages. For example, the embodiments described herein have been shown to cut the number of cycles needed to evict an EPC page roughly in half (e.g., 13 k vs. 25 k on 2.2 Ghz CPU). Also, the embodiments described herein allow the system software (OS or VMM) to evict clean EPC pages without encryption. Thus, the embodiments described herein may also permit the system software (OS or VMM) to use similar aging algorithms or other page replacement algorithms used for non-enclave pages to decide which enclave (EPC pages) are better candidates for eviction (e.g., is PTE.D set).

As described herein, a new type of data structure for the SGX paging architecture, called Unified Meta-Data Structure (UMDS), can be used in connection with the embodiments described herein. UMDS combines version and (some parts of) Paging Crypto Meta-Data (PCMD) into one data structure. Also, a new type of Version Array, called Extended VA (or EVA) or Restricted EVA (REVA), can be used to store instances of UMDS (in EVA slots) for evicted EPC pages. Also, as described herein, new ENCLS leaf functions: EWBE and ELDE that operate in a similar manner EWB and ELDx but operate on UMDS and EVA, instead of the split data structures where VER is stored in the protected region of memory and PCMD is stored in non-protected region of memory. Also, an extended instruction, EMKEVA, can be used to create EVA pages. Also, an extended instruction, EMKREVA, can be used to create REVA pages. It should be understood that "secure," "enclave," and "EPC" are used interchangeably herein.

FIG. 1 is a block diagram illustrating a computing system 100 for implementing secure memory paging according to one embodiment. A processing device 110 may include one or more processing cores 120 and one or more system agents 130. The one or more processing cores 120 may include a page miss handler 134, a translation lookaside buffer 142, all caches (e.g., cache 160) except a last-level cache (LLC) 152, which may reside in the one or more system agents 130. The one or more system agents 130 includes one or more memory encryption engine(s) 132, an input/output memory management unit (IOMMU) 136, one or more memory controller(s) 140. The one or more system agents 130 may also include one or more hardware prefetchers 160 associated with the cache 160, the LLC 152, and so forth. The one or more system agents 130 may include a point-to-point processor interconnect controller 162 (e.g., QPI controllers) and routing logic 164 that routes memory accesses to the correct memory controllers either locally or remotely through a point-to-point processor interconnect (e.g., QPI) based on memory addresses and some routing rules. Each of the components in the processing device 110 may be communicatively coupled to one another or just a portion of the other components. For example, the processing core 120 may be communicatively coupled to the cache 150 and the system agent 130. Further, the processing device 110 may be coupled to a memory device 170 that includes a protected region(s) 172.

The one or more protected regions 172 may be setup at boot time by a basic input-output system (BIOS) and may include one or more EPC pages 182, one or more EVA pages 184, and one or more EPCMs 188. An EVA page 184 may include multiple EVA slots in which UMDSs 186 are stored. Secure paging logic 180 can use the EVA page 184 and EPCM 188 to create EPC pages 182, evict EPC pages 182, and restore EPC pages 182, as described herein. The processing device 110 may execute instructions to create, evict, and restore EPC pages 184 as guided by software executing on the processing device 110, such as an operating system (OS) or a virtual machine monitor (VMM), as described herein. Also, the memory protections afforded by the MEE 132 may be transparent in the sense that the processing device 110 does not execute any instructions for providing confidentiality, integrity and replay protections. For example, when any cache line belonging to a secure page is evicted, the MEE 132 may automatically provide these protections to that cache line. The processing device 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 110 may be used in a system on a chip (SoC) system.

The computing system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

The one or more processor cores 120 may execute instructions of the system. The processor core 120 includes, but is not limited to, pre-fetch logic to fetch instructions, decode logic to decode the instructions, execution logic to execute instructions and the like. The processing device 110 includes the cache 150 to cache instructions and/or data. The cache 150 includes, but is not limited to, level one, level two, and the LLC 152, or any other configuration of the cache memory within the processing device 110. In another embodiment, the computing system 100 includes a component, such as a processing device 110 to employ execution units including logic to perform algorithms for processing data, in accordance with the embodiment described herein.

The prefetcher 160 may determine instructions and/or data to prefetch from the memory device 170 in an attempt to improve performance and reduce latency. The prefetcher 160 may prefetch the instructions and/or data based on previously executed instructions and/or previously used data. The hardware prefetcher 160 may operate transparently to fetch streams of data and instructions from the memory device 170 into the cache 150. The prefetcher 160 may handle multiple streams in either the forward or backward direction and the prefetching may occur up to a page boundary.

The memory controller 140 performs functions that enable the processing device 110 to access and communicate with the memory device 170 that includes a main memory 171 (e.g., a volatile memory and/or a non-volatile memory). In one embodiment, the memory controller 140 is coupled to the MEE 132, PMH 134, and the IOMMU 136. In one embodiment, the MEE 132 is located between the last level cache 152 and the memory controller 140 to perform encryption, decryption and authentication of the data lines moving in and out of the protected region 172 of system memory 170 (e.g., which may be stored on one or more memory devices). The MEE 132 is located on the processor die, while the system memory 170 is located off the processor die. In some embodiments, some or all of the system memory 170 may be located on the processor die, such as in a system on chip with embedded memory.

In one embodiment, the MEE 132 processes multiple memory read requests in parallel to improve the access latency to the protected region 172. The MEE 132 performs counter-mode encryption which requires the encryption seed to be unique for a data line both temporally and spatially. Spatial uniqueness can be achieved by using the address of the data line to be accessed, while temporal uniqueness can be achieved by using a counter that serves as the version of the data line. In one embodiment, the MEE 132 also protects the data lines in the protected region 172 of the memory device 170 using an integrity and replay-protection tree, which is a data structure referred to as the MEE tree 133. The versions of the data lines are part of this MEE tree 133. The MEE tree 133 may be used to check the integrity of the secure pages. The MEE tree 133 may include counters used for counter-mode encryption and decryption and may include Message Authentication Codes (MACs) associated with the secure cache lines. The MACs may be computed by the MEE 132 for secure writes and the MACs may be checked on secure reads. These counters and MACs may be maintained in the MEE tree 133 by the MEE 132 for each 64-byte memory block. The instructions described herein may include logic (of the secure paging logic 180) that causes the MEE 132 to track the states, attributes, and other meta-data of the EPC pages 182 to evict and restore the EPC pages as described herein.

As disclosed herein, other system agents 130 include the PMH 134 and the IOMMU 136. The PMH 134 and the IOMMU 136 may be used during a page walk, which refers to translating virtual addresses to physical addresses for pages that are requested to be accessed. During page walks, the PMH 134 and the IOMMU 136 perform access control checks when devices access memory. In one embodiment, the devices are not allowed to access EPC so the IOMMU 136 cannot read the EPCM. In other embodiments where devices are allowed to access EPC, the PMH 134 and the IOMMU 136 perform access control checks by reading from the EPCM, which includes meta-data for the page.

According to one embodiment, as described above, the SGX paging architecture with the UMDS extensions can include a new type of version array called Restricted EVA or REVA and change the operations of the EWBE and ELDE instructions. REVA pages and evicted pages belong to the same enclave and they have the same parent SECS. REVA slots are used to store UMDS instances describing evicted pages of the same enclave. Enclave pages in EPC and evicted EPC pages can be described by two new attributes in the EPCM 188 and UMDS 186: Clean (C) and Replay-Protected (RP). EPCM.C is set by ELDE and cleared by the processing device 110 on write operations. ELDE may not always destroy UMDS 186 when loading enclave pages. In some cases, ELDE protects UMDS 186 from being used again by another instance of ELDE. Such protected UMDS 186 is called replay-protected UMDS or RP-UMDS. EWBE distinguishes between an empty REVA slot and a REVA slot populated with RP-UMDS. If the slot is populated with RP-UMDS, EWBE verifies that UMDS 186 contains information for the target page. If UMDS 186 contains information for the target page and the target page is Clean, EWBE removes the target page from the EPC without any crypto operations as described herein. If the target page is not Clean, EWBE creates a new version, encrypts the target page, compute a new MAC, and replaces the contents of UMDS 186. EWBE and ELDE may return advisory codes depending on actions taken. ERDINFO returns values of EPCM.C and EPCM.RP. The OS uses this information to correctly manage REVA slots and encrypted enclave pages. In another embodiment, instead of clearing EPCM.C on writes, the processing device 110 triggers a page fault (#PF) that cause the logical processor to exit enclave mode via AEX and then invoke the OS kernel's page fault handler. The OS has to execute a new ENCLS leaf function (e.g., ECLRC) to allow the write.

The system memory 170, also referred to as main memory, is divided into regions, including one or more protected regions 172 (also referred to herein as secure memory range or MEE region), and one or more non-protected regions 174. The non-protected regions 174 can store the system software 171, as well as non-EPC pages and encrypted pages corresponding to evicted EPC pages 184. Each protected region 172 can have multiple sections, an EPC section, a hardware reserved section of replay-protection and integrity meta-data, and another hardware reserved section which is internal to implementation. In one embodiment, the protected region (MEE region) may be a fixed range or multiple protected regions (MEE regions) may be a set of multiple fixed ranges. In another embodiment, the entire memory could be configured as flexible memory, divided into multiple MEE regions. As described herein, the system memory 170 may include multiple secure memory ranges (referred to herein as MEE regions) and may also include non-secure memory ranges.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment may be described in the context of a single processor desktop or server system, but alternative embodiments may be included in a multiprocessor system. System 100 may be an example of a 'hub' system architecture. The computer system 100 includes a processing device 110 to process data signals. The processing device 110, as one illustrative example, includes a complex instruction set computer (CISC) microprocessor, a reduced instruction set computing (RISC) microprocessor, a very long instruction word (VLIW) microprocessor, a processing device implementing a combination of instruction sets, or any other processor device, such as a digital signal processor, for example. The processing device 110 is coupled to a processor bus that transmits data signals between the processing device 110 and other components in the system 100, such as memory device 170 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processing device 110 includes the internal cache 150. Depending on the architecture, the processing device 110 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processing device 110, in one embodiment, includes a microcode (μcode) ROM to store microcode, which when executed, is to perform algorithms for certain macroinstructions or handle complex scenarios.

Here, microcode is potentially updateable to handle logic bugs/fixes for processing device 110.

Alternate embodiments of an execution unit may also be used in micro controllers, embedded processors, graphics devices, DSPs, and other types of logic circuits. System 100 includes one or more memory devices for the system memory 170. Memory devices may include one or more dynamic random access memory (DRAM) devices, static random access memory (SRAM) devices, flash memory devices, or other memory devices. Memory devices store instructions and/or data represented by data signals that are to be executed by the processing device 110. The processing device 110 is coupled to the memory devices (depicted as system memory 170 via a processor bus. A system logic chip, such as a memory controller hub (MCH) may be coupled to the processor bus and system memory 170. An MCH can provide a high bandwidth memory path to system memory 170 for instruction and data storage and for storage of graphics commands, data, and textures. The MCH can be used to direct data signals between the processing device 110, system memory, and other components in the system 100 and to bridge the data signals between processor bus, memory device 170, and system I/O, for example. The MCH may be coupled to system memory 170 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the system memory, chipset, and processing device 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the instructions executed by the processor core 120 can be used with a system on a chip. One embodiment of a system on a chip comprises of a processing device and a memory device. The memory device for one such system is a flash memory. The flash memory can be located on the same die as the processing device and other system components. Additionally, other logic blocks such as a memory controller or graphics controller can also be located on a system on a chip.

Modern OS kernels take advantage of address translation to implement page swapping, also referred to as paging. In a nutshell, paging allows the OS kernel to over-commit the computer's DRAM by evicting rarely used memory pages to a slower storage medium called the disk. Paging is a key contributor to utilizing a computer's resources effectively. For example, a desktop system whose user runs multiple programs concurrently can evict memory pages allocated to inactive applications pages out of without a significant degradation in user experience. Conventionally, the OS cannot be allowed to evict an enclave's EPC pages via the same methods that are used to implement page swapping for DRAM memory outside the PRM range. In the SGX threat model, enclaves do not trust the system software, so the SGX design offers an EPC page eviction method that can defend against a malicious OS that attempts any of the active address translation attacks. The price of the security afforded by SGX is that an OS kernel that supports evicting EPC pages uses a modified page swapping implementation that interacts with the SGX mechanisms, such as described and illustrated with respect to FIG. 3. The embodiments described herein can use traditional page swapping implementations using the data structures and instructions described herein as illustrated and described below with respect to FIGS. 2, 4, and 6-7.

Figure 2:
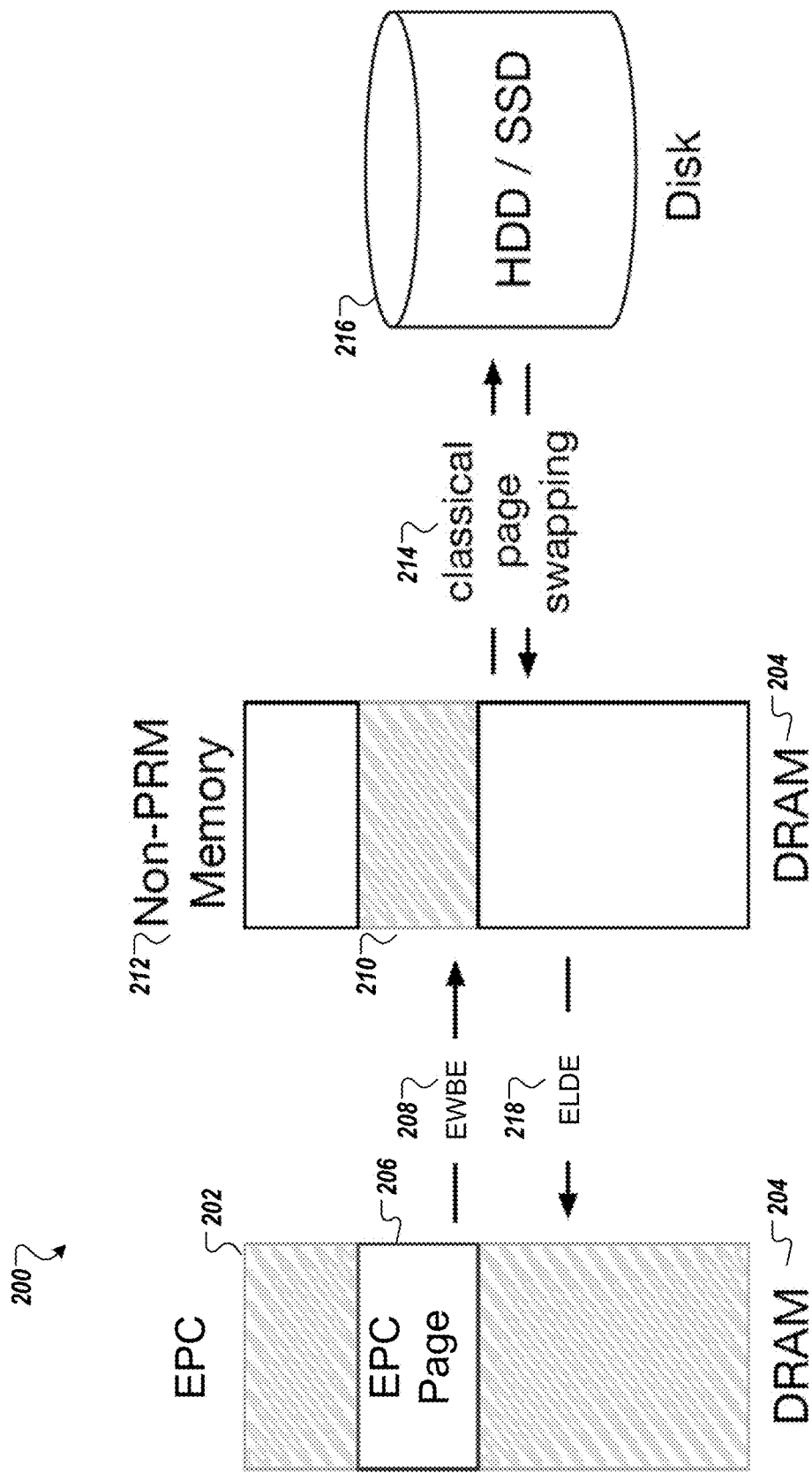
FIG. 2 illustrates secure memory paging of a secure page from a protected memory region to disk according to one embodiment.

FIG. 2 illustrates secure memory paging 200 of a secure page (EPC page) 206 from an EPC 202 (protected memory region) to disk 216 according to one embodiment. As illustrated in FIG. 2, SGX supports evicting EPC pages 206 to DRAM pages 210 outside a processor reserved memory (PRM) range in non-PRM memory 212. The system software is expected to use its existing page swapping implementation 214 (labeled as class page swapping) to evict the contents of these pages out of DRAM 204 and onto disk 216.

Previously, SGX's eviction feature revolves around the EWB instruction, which evicts an EPC page into a DRAM page outside the EPC and marks the EPC page as available, by zeroing the VALID field in the page's EPCM entry. The SGX design relies on symmetric key cryptography to guarantee the confidentiality and integrity of the evicted EPC pages, and nonces (page versions) to guarantee the freshness of the pages brought back into the EPC. These nonces are stored in Version Arrays (VAs), which are EPC pages dedicated to nonce storage. Before an EPC page is evicted and freed up for use by other enclaves, the SGX implementation must ensure that no TLB has address translations associated with the evicted page, in order to avoid the TLB-based address translation attack. SGX leaves the system software in charge of managing the EPC. The SGX instructions used to implement EPC paging are only available to system software, which runs at ring 0. In today's software stacks, the OS kernel implements page swapping in order to support the over-committing of DRAM. The VMM (or hypervisor) is only used to partition the computer's physical resources between operating systems. Therefore, this section is written with the expectation that the OS kernel will also take on the responsibility of EPC page swapping. For simplicity, the term "system software," as it pertains to paging, can be considered the OS kernel. However, in other embodiments, the VMM (or hypervisor) implements its own EPC page swapping. Therefore, the system software that performs EPC paging can be the OS or VMM (hypervisor). The EPC page eviction process is completed when the OS executes an EWB instruction for each EPC page to be evicted. This instruction writes an encrypted version of the EPC page to be evicted into DRAM, and then frees the page by clearing the VALID and BLOCKED bits in its EPCM entry. Before carrying out its tasks, EWB ensures that the EPC page that it targets has been blocked, and checks the state set up by ETRACK to make sure that all the relevant TLBs have been flushed. An evicted page can be loaded back into the EPC via the ELDU and ELDB instructions. Both instructions start up with a free EPC page and a DRAM page that has the evicted contents of an EPC page, decrypt the DRAM page's contents into the EPC page, and restore the corresponding EPCM entry. The only difference between ELDU and ELDB is that the latter sets the BLOCKED bit in the page's EPCM entry, whereas the former leaves it cleared. ELDU and ELDB resemble ECREATE and EADD, in the sense that they populate a free EPC page. Since the page that they operate on was free, the SGX security model predicates that no TLB entries can possibly target it. Therefore, these instructions do not require a mechanism similar to EBLOCK or ETRACK.

Referring back to FIG. 2, SGX's eviction feature has been extended to include extended instructions, including EWBE instruction 208, which evicts an EPC page 206 into a DRAM page 210 outside the EPC 202. The EWBE instruction 208 checks a first attribute of an EPCM entry to determine whether the EPC page is clean (not dirty). The EWBE instruction 208 checks a second attribute of the EPCM entry to determine whether the EPC page 206 is replay protected. The EWBE instruction 208 also checks whether a UMDS (or other unified version-paging data structure stored in EPC 202) is replay protected. The UMDS stores both version meta-data and page meta-data to restore the EPC 206 page to the EPC 202 when reloaded. In one embodiment, the UMDS must be replay-protected and must reside in a REVA page that belongs to the same enclave as the target page and a linear address in the UMDS matches a linear address in the EPCM entry that describes the target page. If the page is dirty a new encrypted copy will be generated and UMDS replaced. On the other hand, even if the page is clean but the UMDS doesn't match or is invalid, also a new encrypted copy will be generated. In another embodiment, the EWBE instruction 208 determines whether the contents of the UMDS match the target page using other techniques or mechanisms.

The EWBE instruction 208 removes the EPC page 206 from the EPC 206 without encrypting the contents of the EPC page 206 when the first attribute indicates that the EPC page 206 is clean and the EPC page 206 is replay protected by the UMDS and the UMDS is replay protected as described herein. Nonces for the version meta-data, which is used to guarantee the freshness of the pages brought back into the EPC 202, can be created and stored in the extended version arrays (EVAs), which are EPC pages dedicated to more than just nonce storage, but the UMDS that includes the version meta-data, as well as other meta-data needed to restore the evicted page back into the EPC 202, ensuring confidentiality and integrity. Once the EPC page 206 is evicted into a non-EPC page 210 of the non-PRM memory 212, classical page swapping 214 can be used to evict the contents of the non-EPC page 210 out of DRAM 204 and onto disk 216.

An evicted page can be loaded back into the EPC 202 via the ELDE instruction 218. The ELDE instruction starts up with a free EPC page and a DRAM page that has the evicted contents of an EPC page, decrypt the DRAM page's contents into the EPC page, and restore the corresponding UMDS (and EPCM entry). The ELDE instruction 218 may also include a blocked version that sets the BLOCKED bit in the page's EPCM entry, whereas the non-blocked version leaves it cleared.

When EWBE evicts the contents of an EPC, it may create an 8-byte nonce, also called a page version. These nonces are stored securely inside the EVA page. Each EVA page may be divided into EVA slots, and each EVA slot may store the UMDS or other secure page data structure). EVA pages are allocated using the EMKEVA instruction, which takes in the virtual address of a free EPC page, and turns it into an EVA page with empty slots. EVA pages may be identified by the PT_EVA type in their EPCM entries Like security information pages (SECS pages), EVA pages have the ENCLAVEADDRESS fields in their EPCM entries set to zero, and cannot be accessed directly by any software, including enclaves. EMKREVA instruction can be used to create REVA pages.

Figure 3:
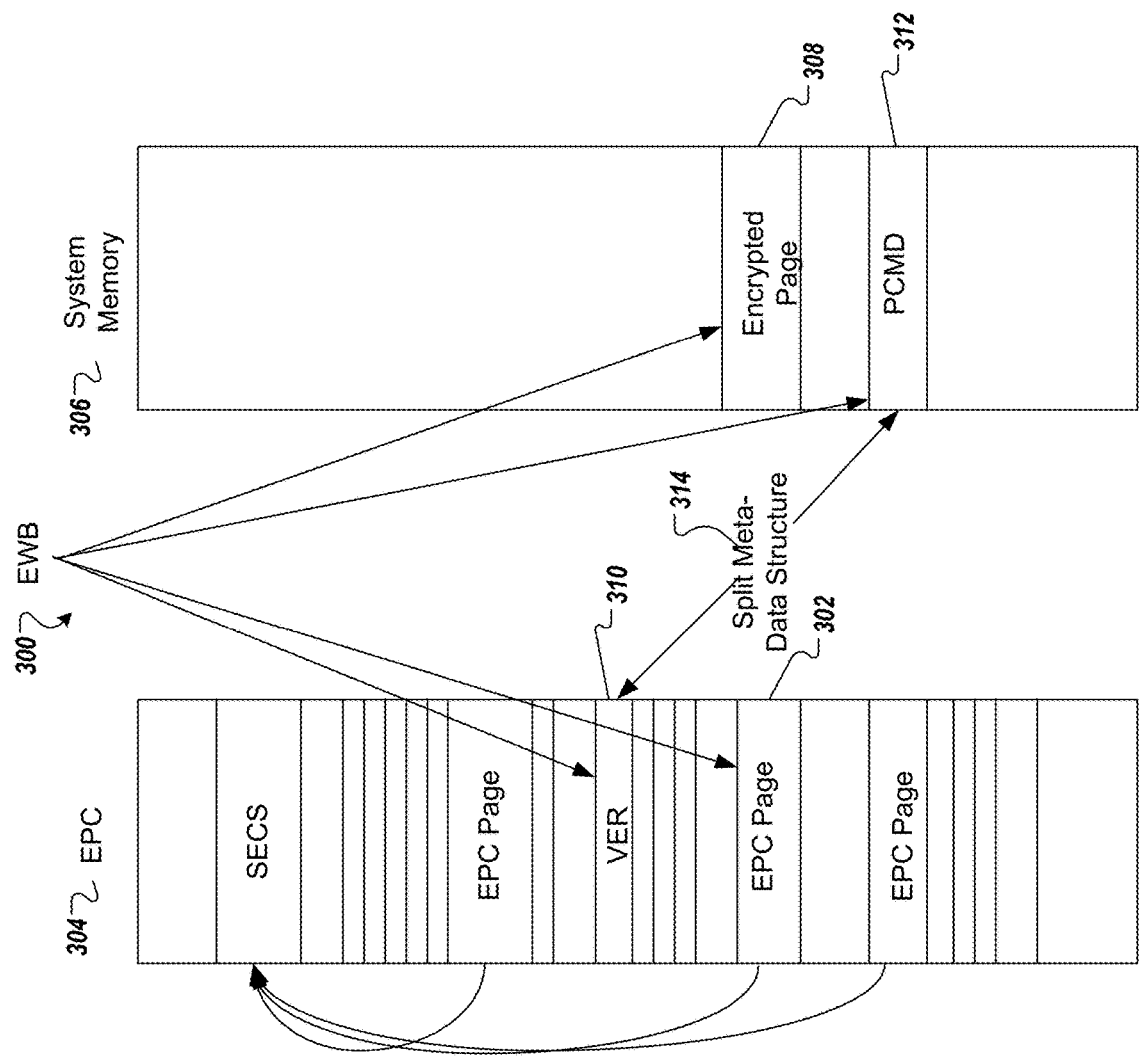
FIG. 3 illustrates a legacy secure write back (EWB) instruction to evict an EPC page from an EPC to a non-protected memory region according to one implementation.

FIG. 3 illustrates a legacy secure write back (EWB) instruction 300 to evict an EPC page 302 from an EPC 304 to a non-protected memory region 306 according to one implementation. The operations of the EWB instruction 300 removes the EPC page 302 from the EPC 304, encrypts the contents of the EPC page 302 to obtain an encrypted page 308 and writes the encrypted page 308 to the non-protected memory region 306 in system memory. The EWB instruction 300 also populates an empty version slots 310 in the VA stored in the EPC 304. The EWB instruction 300 also creates meta-data, called PCMD structure 312, which embeds the security information (SECINFO), which is used to store the page type (PT) and the access permission flags (R, W, X) in the EPCM entry. The PCMD structure also stores the enclave's ID. The fields of the PCMD are later used by ELDU or ELDB to populate the EPCM entry for the EPC page that is reloaded. In sum, the EWB instruction 300 creates split meta-data structures 314 that store version meta-data 310 in the EPC 304 and page meta-data in the form of PCMD 312 in non-protected memory region 306. In one embodiment, the EWB instructions 300 includes EWB parameters, including: a pointer to EPC page 302 that needs to be paged out, a pointer to an empty version slot 310, and a pointer to a location outside EPC 304 at which to store the encrypted page 308. All pages, including SECs and VA can be paged out.

Figure 4:
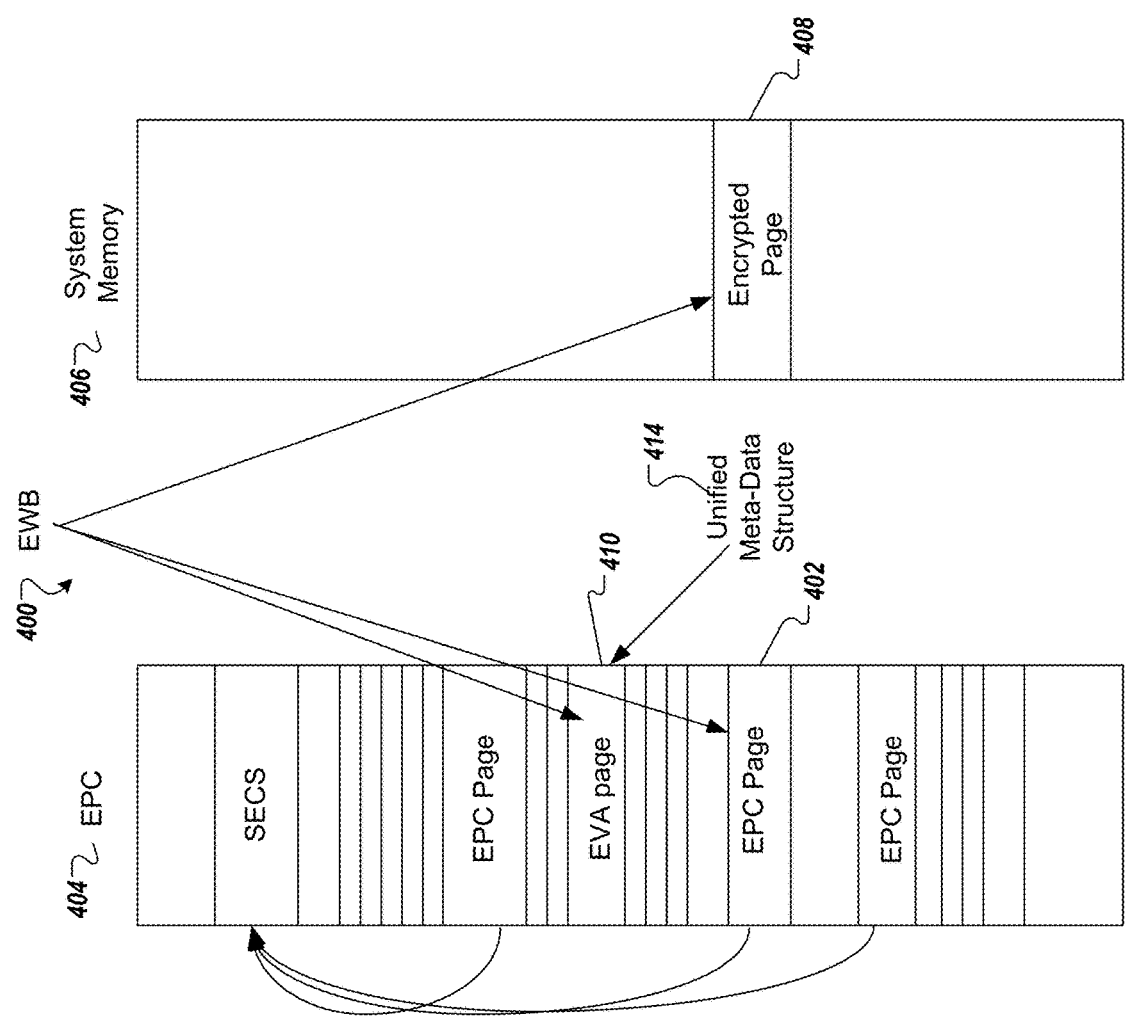
FIG. 4 illustrates an extended secure write back (EWBE) instruction to evict an EPC page from an EPC to a non-protected memory region according to one embodiment.

FIG. 4 illustrates an extended secure write back (EWBE) instruction to evict an EPC page 402 from an EPC 404 to a non-protected memory region 406 of system memory according to one embodiment. The operations of the EWBE instruction 400 removes the EPC page 402 from the EPC 404, encrypts the contents of the EPC page 402 to obtain an encrypted page 408 and writes the encrypted page 408 to the non-protected memory region 406 in system memory. The EWBE instruction 400 also populates an empty EVA slot in an EVA page 410 with the version and the page meta-data in a unified meta-data structure 414, unlike the split meta-data structures of FIG. 3. The unified meta-data structure 414 can also store the security information from SECS, including the PT and the access permission flags (R, W, X) in the EPCM entry. The fields of the unified meta-data structure 414 are later used by ELDE to populate the EPCM entry for the EPC page that is reloaded. In sum, the EWBE instruction 400 creates a unified meta-data structure 414 that stores version meta-data and page meta-data in the EPC 304. In one embodiment, the EWB instructions 400 includes EWBE parameters, including: a pointer to EPC page 302 that needs to be paged out, a pointer to an empty version slot in the EVA page 410, and a pointer to a location outside EPC 404 at which to store the encrypted page 408. All pages, including SECs and EVA can be paged out.

Figure 5:
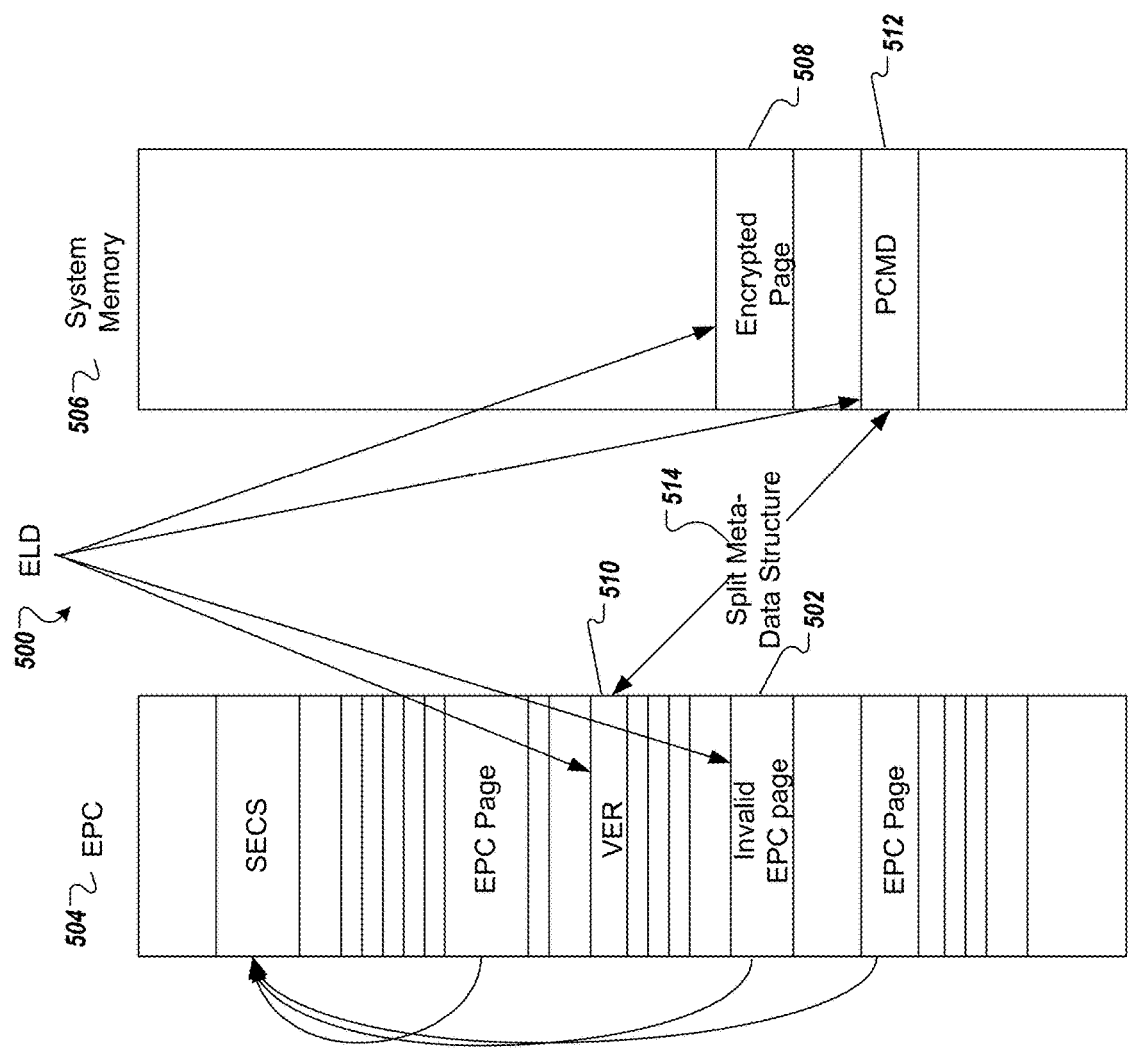
FIG. 5 illustrates a legacy secure load (ELD) instruction to restore an encrypted page from a non-protected memory region to an EPC according to one implementation.

FIG. 5 illustrates a legacy secure load (ELD) instruction 500 to restore an encrypted page 508 from a non-protected memory region 506 to an EPC 504 according to one implementation. The operations of the ELD instruction 500 verifies and decrypts the encrypted page 508 using the version meta-data in the version slot 510 in the VA stored in the EPC 504, populates the invalid EPC page 502, and frees up the version slot 510 in the VA stored in the EPC 504 after the decrypted page is stored in the EPC page 502. The ELD instruction 500 uses the PCMD structure 512 to populate the EPCM entry for the EPC page 502 that is reloaded. In sum, the ELD instruction 500 use the split meta-data structures 514 that stores version meta-data 510 in the EPC 504 and page meta-data in the form of PCMD 512 in non-protected memory region 506. In one embodiment, the ELD instructions 500 includes ELD parameters, including: a pointer to the encrypted page 508, a pointer to the free EPC page 502, SECs for the EPC page 502, and a pointer to the version slot 510 in the VA page.

Figure 6:
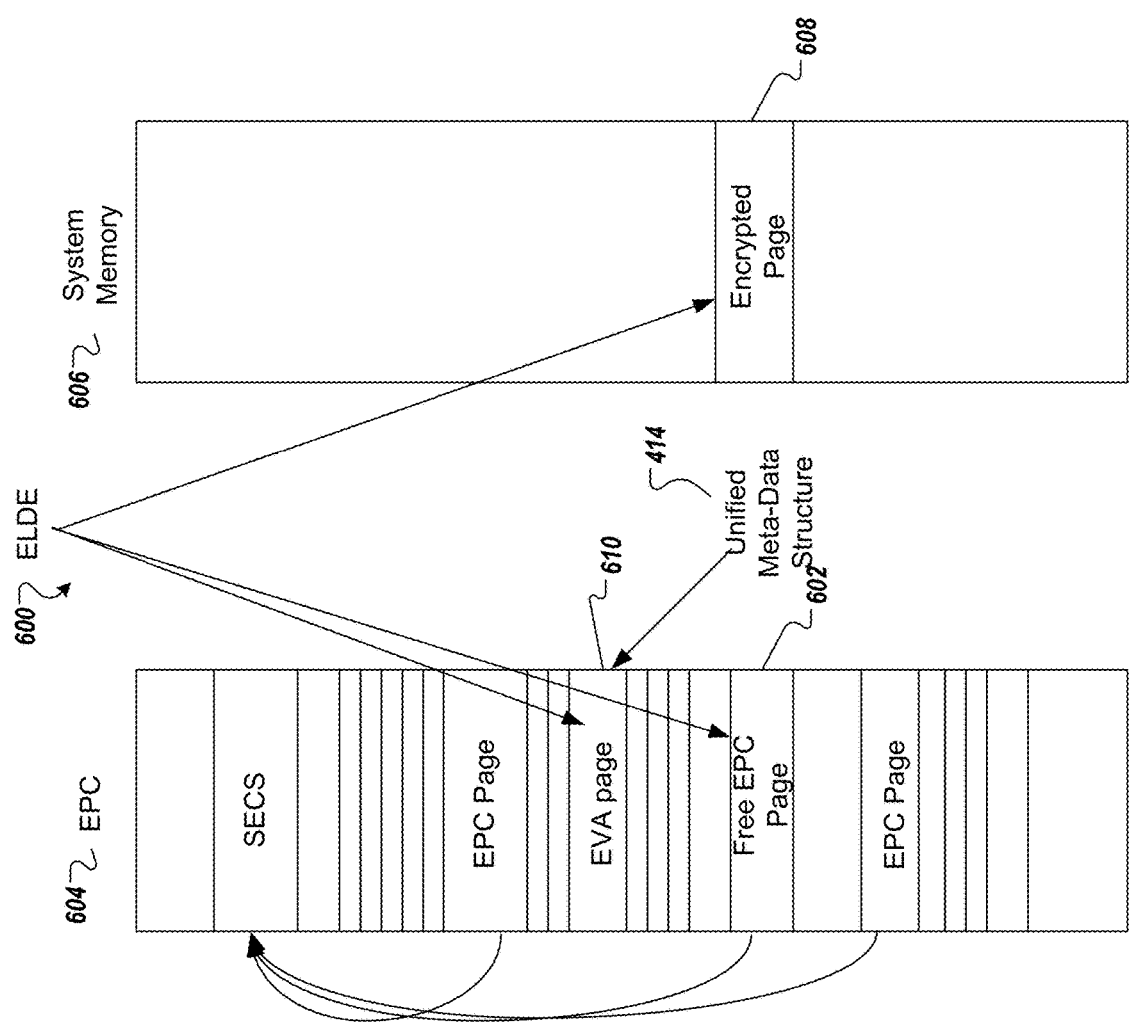
FIG. 6 illustrates an extended secure load (ELDE) instruction to restore an encrypted page from a non-protected memory region to an EPC according to one implementation.

FIG. 6 illustrates an extended secure load (ELDE) instruction 600 to restore an encrypted page 608 from a non-protected memory region 606 to an EPC 604 according to one implementation. The operations of the ELDE instruction 600 verify and decrypt the encrypted page 608 using the version meta-data in the EVA slot 610 in the EVA page stored in the EPC 604 and populates the free EPC page 602. The ELDE instruction 600 may also make back-pointer connections, if applicable, and free up the EVA slot 610 in the EVA stored in the EPC 604 after the decrypted page is stored in the free EPC page 602. Each EPCM slot has a field called ENCLAVESECS. When a regular enclave page or TCS page is loaded into EPC by EADD, EAUG, ELDU/B or ELDE, this field is populated with the address of the parent SECS page. Sometimes the field ENCLAVESECS is referred to as "back-pointer." Since not all pages have parent SECS pages, this field is set to "invalid" for those pages. Thus, the ELDE instruction 600 may make back-pointer connections, if applicable. The ELDE instruction 600 uses the unified meta-data structure 612 to populate the EPCM entry for the EPC page 602 that is reloaded. In sum, the ELDE instruction 600 use the unified meta-data structures 614 that stores version meta-data and page meta-data in the EPC 604. In one embodiment, the ELDE instructions 600 includes ELD parameters, including: a pointer to the encrypted page 608, a pointer to the free EPC page 602, SECs for the EPC page 602, and a pointer to the EVA slot 610 in the EVA page in EPC 604.

Figure 7:
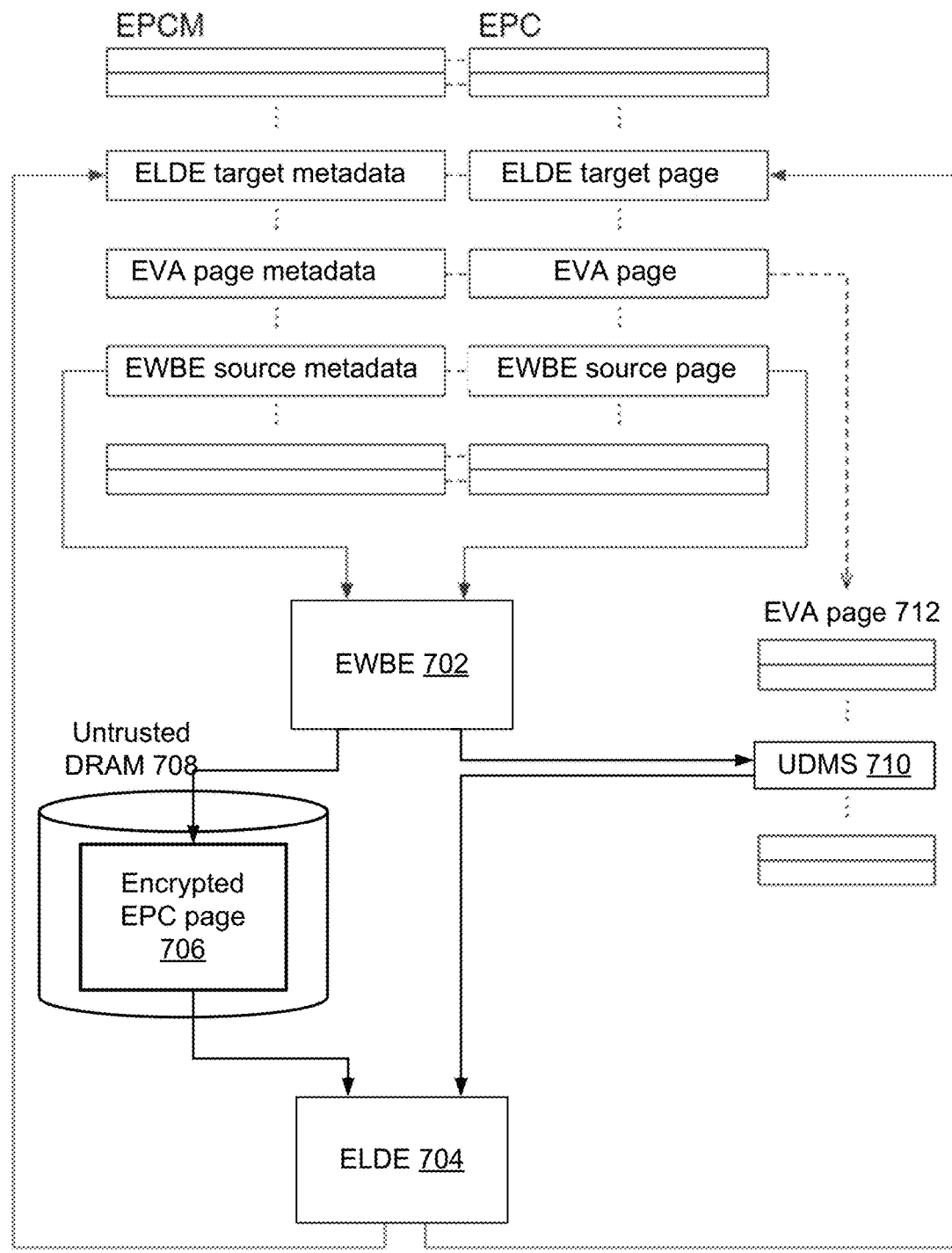
FIG. 7 illustrates outputs of the EWBE instruction when evicting an EPC page that is used by the ELDE instruction to restore the evicted EPC page back into an EPC with confidentiality, integrity, and freshness according to one embodiment.

FIG. 7 illustrates outputs of a EWBE instruction 702 when evicting an EPC page that is used by an ELDE instruction 704 to restore the evicted EPC page back into an EPC with confidentiality, integrity, and freshness according to one embodiment. System software evicts an EPC page using the EWBE instruction 702 which produces all the data needed to restore the evicted page at a later time via the ELDE instruction 704. The EWBE instruction 702 outputs encrypted contents of the evicted EPC page 706 into an non-EPC page in the non-protected region 708 (e.g., untrusted DRAM outside the PRM area) and version meta-data and page meta-data into a UMDS 710 stored at a EVA slot of the EVA page 712. The EVA page 712 is an EPC page in EPC. The version meta-data and page meta-data may include a subset of the fields in the page's EPCM entry, a message authentication code (MAC) tag, and a nonce generated by the EWBE 702. All this information is used by the ELDE instruction 704 to load the evicted page back into the EPC, with confidentiality, integrity, and freshness guarantees. Thus, the ELDE's inputs include the encrypted version of the evicted EPC page's contents 706 and the version meta-data and page meta-data from the UMDS 710.

The EWBE instruction 702 writes its output in DRAM outside the PRM area, so the system software can choose to further evict it to disk. The EPC page contents are encrypted, to protect the confidentiality of the enclave's data while the page is stored in the untrusted DRAM outside the PRM range. Without the use of encryption, the system software could learn the contents of an EPC page by evicting it from the EPC.

FIG. 8A is a table 800 that shows a clean attribute 802 and a replay-protected attribute 804 that can be stored in bits of an Enclave Page Cache Map (EPCM) 806 used to track EPC pages in an EPC according to one embodiment. The table 800 for the EPCM 806 includes columns with a state 808, a value for the clean attribute 802, a value for the replay-protected attribute 804, and a corresponding description 810 for the corresponding state based on values of the clean attribute 802 and replay-protected attribute 804. The table 800 shows four states: 1) a legacy state when the clean attribute 802 is 0 and the replay-attribute 804 is 0; 2) Dirty RP page state when the clean attribute 802 is 0 and the replay-attribute 804 is 1; 3) #MC state (machine check exception) when the clean attribute 802 is 1 and the replay-attribute 804 is 0; and 4) Clean RP page state when the clean attribute 802 is 1 and the replay-attribute 804 is 1. The #MC state is invalid and can only happen due to a hardware error. Hardware errors are signaled with #MC.

FIG. 8B illustrates a table 850 that shows a clean attribute 852 and a replay-protected attribute 854 that can be stored in bits of in a Unified Meta-Data Structure (UMDS) 856 used to restore encrypted pages to the EPC according to one embodiment. The table 850 for the UMDS 856 includes columns with a state 858, a value for the clean attribute 852, a value for the replay-protected attribute 854, and a corresponding description 860 for the corresponding state based on the values of the clean attribute 852 and replay-protected attribute 854. The table 850 shows four states: 1) a legacy state when the clean attribute 802 is 0 and the replay-attribute 804 is 0; 2) Dirty RP page state when the clean attribute 802 is 0 and the replay-attribute 804 is 1; 3) a replay-protected UMDS state when the clean attribute 802 is 1 and the replay-attribute 804 is 0; and 4) Clean RP page state when the clean attribute 802 is 1 and the replay-attribute 804 is 1.

Figure 9:
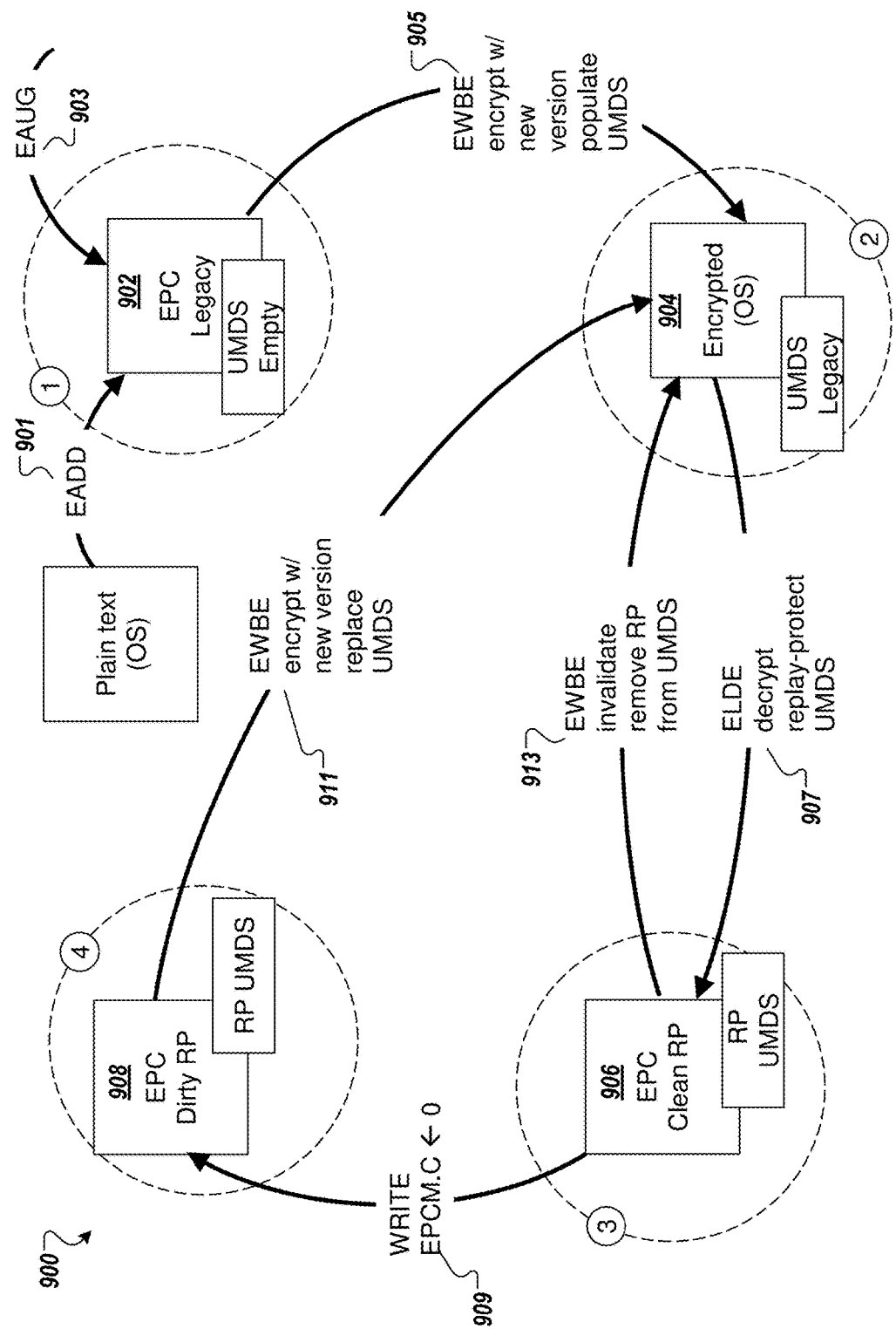
FIG. 9 is a state transition diagram that shows how an OS manages an EPC page from when it is first loaded into the EPC according to one embodiment.

FIG. 9 is a state transition diagram 900 that shows how an OS manages an EPC page from when it is first loaded into the EPC according to one embodiment. A page may be in one of four states at any given point in time. The four states include EPC legacy state 902, encrypted state (OS) 904; EPC Clean RP state 906, and EPC Dirty RP state 908. Which state the page is in is dependent upon two different bits, a clean bit (C) and a replay-protected bit (RP). After an EADD instruction 901 to create an EPC from plain text or an EAUG instruction 903, a page enters in the EPC legacy state in which the UMDS is empty. The system software can execute a EWBE instruction 905 to evict the EPC page, which encrypts the EPC page with a new version and populates the UMDS. The stage of the page transitions from the EPC legacy state 902 to the encrypted state 904. The UMDS state in the encrypted state 904 is in the UMDS legacy state with clean (C) bit set to zero and the replay-protected bit (RP) bit set to zero. The system software can execute an ELDE instruction 907 to restore the evicted EPC page, which decrypts the encrypted page with the version meta-data in the UMDS. The state of the page transitions from the encrypted state 904 to the EPC clean RP state 906. In the EPC clean RP state 906, the UMDS state is the clean RP page state (RP UMDS state) with the C bit set to one and the RP bit cleared to 0. This is a special encoding that may be used when the enclave page is loaded in EPC. Note that this setting in EPCM is illegal and causes #MC when detected by hardware. In another embodiment, this setting could also be made illegal in UMDS and another bit in the UMDS could be added to denote RP UMDS. This setting can be used to indicate that the enclave page, described by this UMDS, is loaded in EPC. In another embodiment, another bit could be added to the UMDS called Loaded, for example. In the event 909 that the clean EPC page is written to, the CPU sets the EPCM.C to zero, indicating that the EPC page is no longer clean and is now a dirty EPC page, and transitioning the state of the page from the EPC Clean RP state 906 to the EPC Dirty RP state 908. While in the EPC Dirty RP state 908, the system software can execute a second instance of EWBE instruction 911 to evict the dirty EPC page. The EWBE instruction 911 encrypts the EPC page with a new version to replace the UMDS with a new UMDS. The state of the page transitions from the EPC Dirty RP state 908 to the encrypted state 904. While in the EPC Dirty RP state 906, the system software can execute a second instance of EWBE instruction 913 to evict the clean EPC page. The EWBE instruction 913 does not encrypt the clean EPC page, but invalidates the UMDS by removing the RP from the UMDS. The state of the page transitions from the EPC Clean RP state 906 to the encrypted state 904. The state transitions of the state diagram 800 are shown when the system software is the operating system (OS) or other applications. Similar states and state transitions can be used for guest EPC pages when the system software is a hypervisor or VMM as illustrated and described with respect to FIGS. 10-11.

Figure 10:
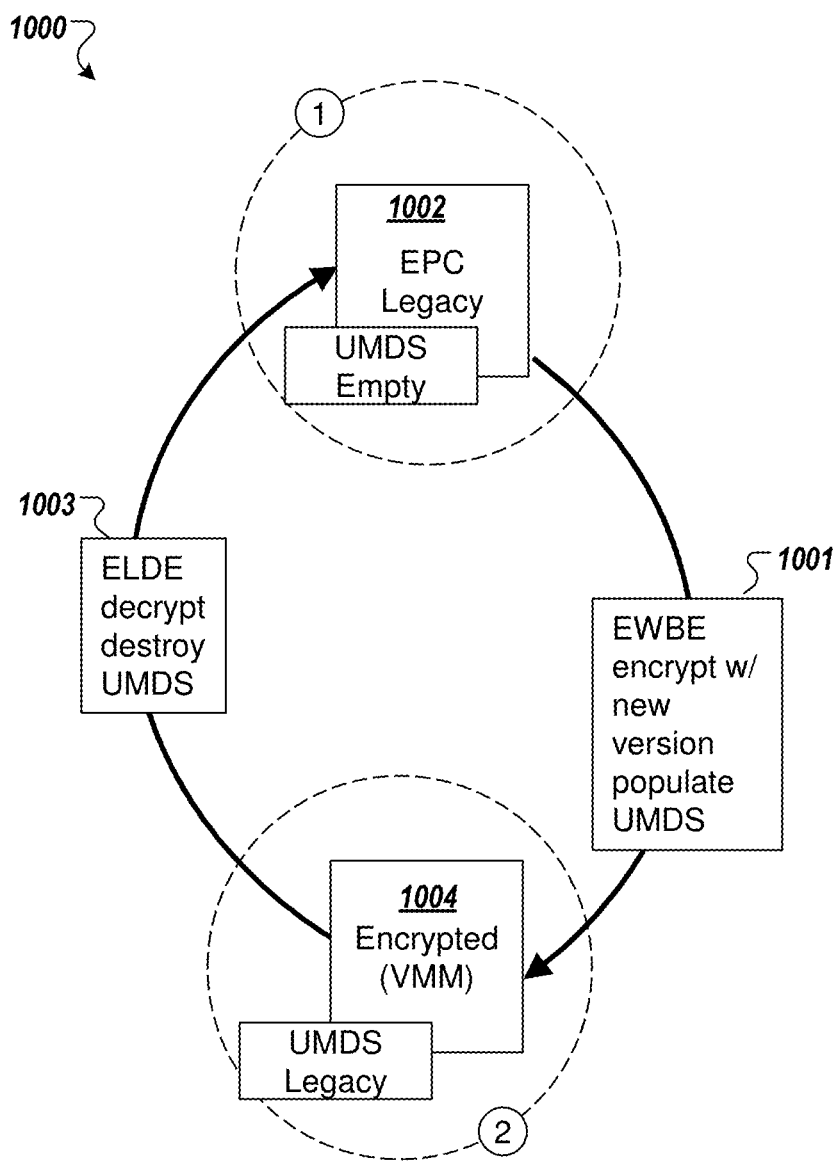
FIG. 10 is a state transition diagram that shows how a Virtual Machine Monitor (VMM) implements oversubscription of guest EPC pages in various states according to one embodiment.
Figure 11:
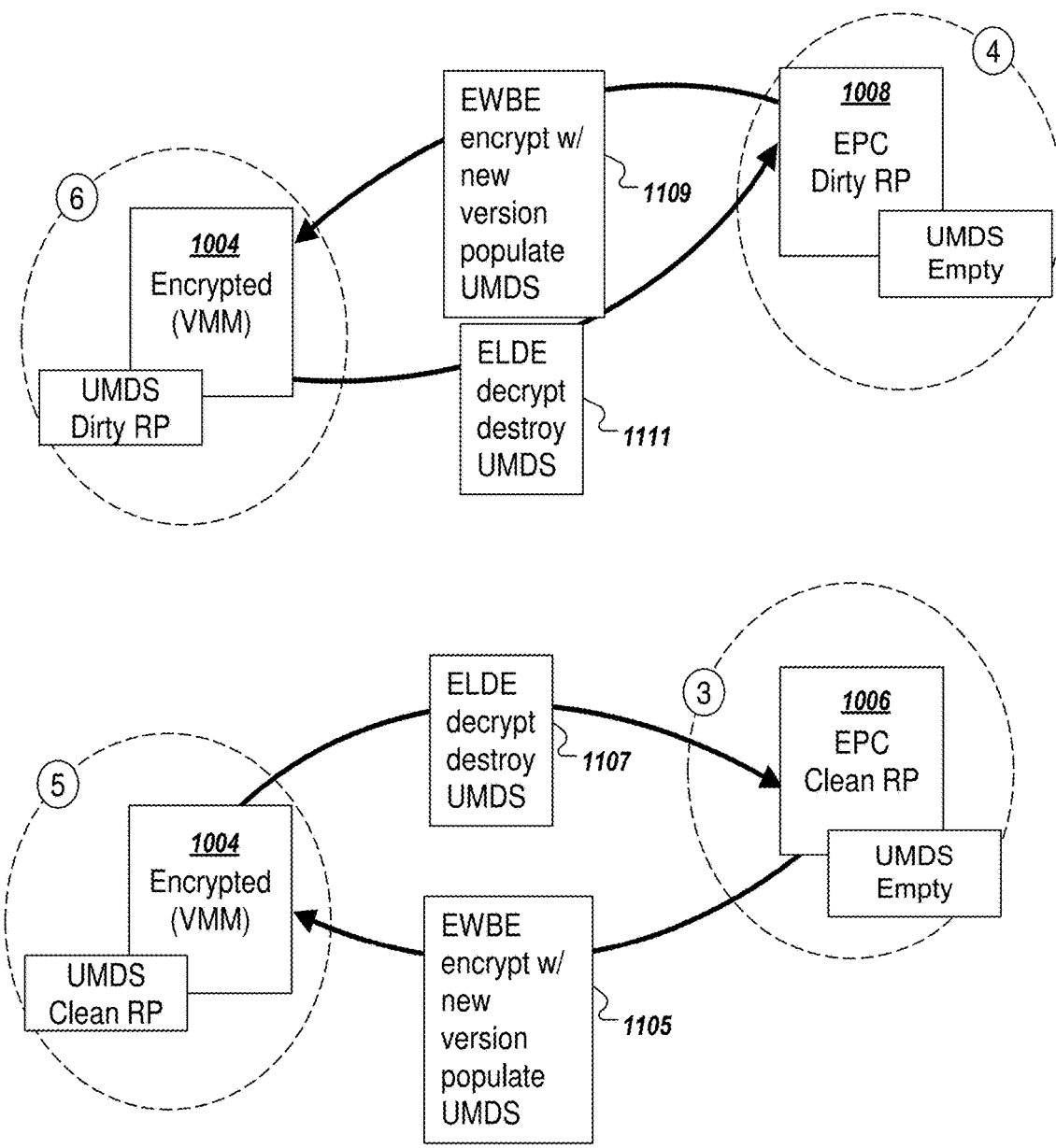
FIG. 11 is a state transition diagram that shows how the VMM implements oversubscription of guest EPC pages in various states according to one embodiment.

FIGS. 10-11 are state transition diagrams 1000, 1100 that shows how a Virtual Machine Monitor (VMM) implements oversubscription of guest EPC pages in various states according to one embodiment. A guest EPC page may be in one of four states at any given point in time. The four states include EPC legacy state 1002, encrypted state (VMM) 1104; EPC Clean RP state 1006, and EPC Dirty RP state 1008. The state of the guest EPC page is dependent upon two different bits, a clean bit (C) and a replay-protected bit (RP). The guest EPC page starts in the EPC legacy state 1002 in which the UMDS is empty. The guest EPC page may be in the EPC legacy state 1002 after the UMDS is destroyed, as described below. The VMM can execute a EWBE instruction 1001 to evict the EPC page, which encrypts the EPC page with a new version and populates the UMDS. The stage of the page transitions from the EPC legacy state 1002 to the encrypted (VMM) state 1004. The UMDS state in the encrypted state 1004 is in the UMDS legacy state with C bit set to zero and the RP bit set to zero. The VMM can execute an ELDE instruction 1003 to restore the evicted EPC page, which decrypts the encrypted page and destroys the UMDS. The state of the page transitions from the encrypted state 1004 to the EPC legacy state 1002.

In order to prevent creation of UMDS that would allow replay, EWBE must create UMDS that ELDE will always destroy even if the page is clean. Without the RP bit in EPCM, the following sequence would occur in a replay attack:
- (OS) EWBE: create encrypted copy with version1 and UMDS with version1
- (OS) ELDE: load encrypted page as clean with version1 through UMDS with version1 and replay-protect UMDS
- (CPU) write (page is dirty)
- (VMM) EWBE: create encrypted copy with version2 and UMDS with version2 (EWBE uses version2 because the page is dirty)
- (VMM) ELDE: load encrypted page as clean with version2 through UMDS with version2 and replay-protect UMDS
- (OS) EWBE: invalidate page with version2 (because it is clean and RP UMDS that OS has matches)
- (OS) ELDE: load encrypted page as clean with version1 through UMDS with version1 and replay-protect UMDS (replay attack!!!)

So the purpose of the RP bit in EPCM is to taint UMDS when the page is evicted through an empty UMDS. EWBE copies C and RP bits from EPCM to UMDS. ELDE checks UMDS.RP. If UMDS.RP is 1, ELDE loads the page and copies UMDS.C to EPCM, and destroys UMDS so EWBE will always generate encrypted copy with new version. So in the sequence above, VMM would not be able to load the page as clean so EWBE executed by the OS would create a new version because the page is dirty. All UMDSes are EMPTY when VMM executes EWBE and they are destroyed back to empty when VMM executes ELDE.

Referring to FIG. 11, in the EPC clean RP state 1006, the UMDS is empty. The VMM can execute a EWBE instruction 1105 to evict an EPC page, which encrypts the EPC page with a new version to populate the UMDS. The state of the page transitions from the EPC Clean RP state 1006 to the encrypted state 1004. In encrypted state 1004, the UMDS state is the clean RP page state (UMDS clean state) with the C bit set to one and the RP bit set to one. While in the encrypted state 1004, the VMM can execute an ELDE instruction 1107 that decrypts the encrypted page and destroys the UMDS. The state of the page transitions from the encrypted state 1004 to the EPC Clean RP state 1006.

In the EPC dirty RP state 1008, the UMDS is empty. The VMM can execute a EWBE instruction 1109 to evict a dirty EPC page, which encrypts the EPC page with a new version to populate the UMDS. The state of the page transitions from the EPC Dirty RP state 1008 to the encrypted state 1004. In encrypted state 1004, the UMDS state is the dirty RP page state (UMDS dirty state) with the C bit set to zero and the RP bit set to one. While in the encrypted state 1004, the VMM can execute an ELDE instruction 1111 that decrypts the encrypted page and destroys the UMDS. The state of the page transitions from the encrypted state 1004 to the EPC Dirty RP state 1008.

Figure 12:
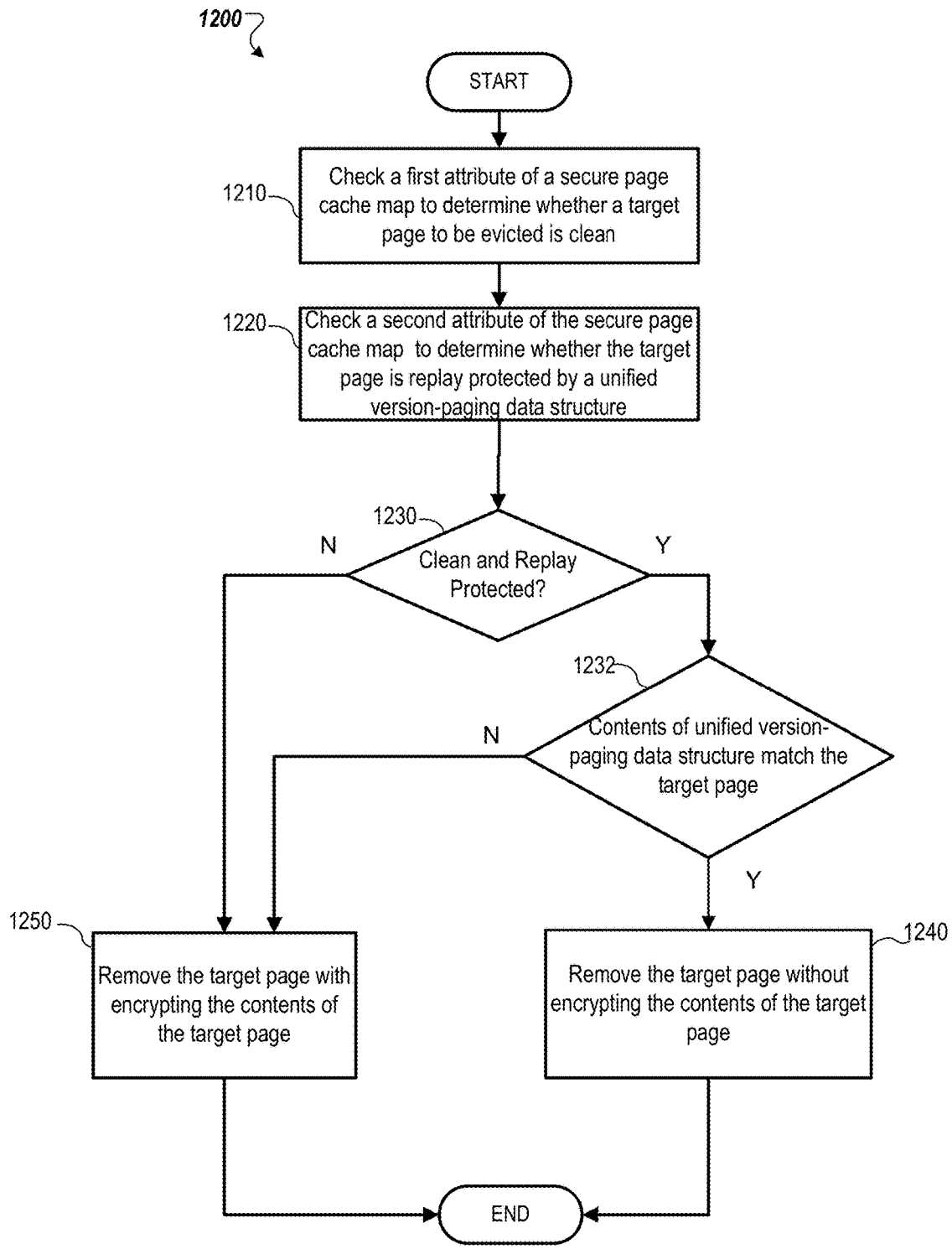
FIG. 12 is a flow diagram of an example method for secure memory paging according to one embodiment.

FIG. 12 is a flow diagram of an example method 1200 for secure memory paging according to one embodiment. Method 1200 may be performed by processing logic that may comprise hardware (e.g., circuitry, dedicated logic, programmable logic, microcode, etc.), software (such as operations being performed by the MCU), firmware, or a combination thereof. In one embodiment, method 1200 is performed by one or more components of the processing device 110 of FIG. 1. In another embodiment, the method 1200 is performed by any of the processing devices or paging logic described with respect to FIGS. 2-11. Alternatively, other components of the computing system 100 (or software executing on the processing device 110) may perform some or all of the operations of the method 1200.

Referring to the method 1200, at block 1210 the processing logic, in response to executing a EWBE instruction, checks a first attribute of a secure page cache map to determine whether a target page is clean. At block 1220, the processing logic checks a second attribute of the secure page cache map to determine whether the target page is replay protected by a unified version-paging data structure. The unified version-paging data structure may be stored in the protected region of memory and includes version meta-data corresponding to the target page and page meta-data to restore the target page to the protected region. At block 1230, the processing logic determines whether the target page is clean and replay protected based on the first and second attributes. If so, at block 1232, the processing logic checks the contents of the unified version-paging data structure match the target page. In one embodiment, the processing logic checks whether a UMDS is replay protected and describes the target page. For example, processing logic can check whether a linear address in the UMDS matches a linear address in the EPCM entry that describes the target page. In one embodiment, the UMDS must be replay-protected and must reside in a REVA page that belongs to the same enclave as the target page, as well as linear addresses matching. If the page is dirty, a new encrypted copy will be generated and UMDS replaced. On the other hand, even if the page is clean but the UMDS doesn't match or is invalid, also a new encrypted copy will be generated.

When the contents of the unified version-paging data structure match the target page at block 1232, the processing logic removes the target page from the protected region of memory without encrypting the contents of the target page when the first attribute indicates that the target page is clean and the target page is replay protected by the unified version-paging data structure (block 1240). The processing logic removes the target page from the protected region of memory with encrypting the contents of the target page when the first attribute indicates that the target page is dirty and/or the target page is not replay protected by the unified version-paging data structure (block 1250) based on the determination at block 1230. The processing logic can also remove the target page from the protected region of memory with encrypting the contents of the target page when the contents of the unified version-paging data structure matches the target page (block 1250) based on the determination at block 1232. The method 1200 ends after blocks 1240 or 1250.

In another embodiment, in response to executing the EWBE instruction, the processing logic further accesses an EVA stored in the protected region, the EVA having multiple EVA slots. A first EVA slot of the multiple EVA slots stores the unified version-paging data structure. The unified version-paging data structure may be a UMDS as described herein. In a further embodiment, the processing logic stores a UMDS in the first EVA slot. In one embodiment, the unified version-paging data structure includes the version meta-data, a linear address, and a MAC tag. In another embodiment, the unified version-paging data structure further includes security information.

In one embodiment, the target page is an enclave page cache (EPC) page and the protected region is an EPC. In response to executing the EWBE instruction, the processing logic removes the EPC page from the EPC, populates the EVA slot with the version meta-data, encrypts the EPC page with the version to obtain the encrypted page, writes the encrypted page to a location in the non-protected region of the memory, and writes the version meta-data corresponding to the EPC page and the page meta-data to the unified version-paging data structure in the EVA slot.

In another embodiment, the processing logic, in response to executing the ELDE instruction to restore the encrypted page, verifies and decrypts the encrypted page using the version meta-data stored at the EVA slot to obtain a decrypted page and identifies and populates a free EPC page in the EPC with the decrypted page.

In one implementation of paging, the processing logic, in response to the EWBE instructions, increments, encrypts, and stores version, MAC tag, and linear address (LA) in UMDS. The MAC may include a secure container identifier, such as enclave ID (EID). The processing logic, in response to the ELDE instruction, decrypts, verifies the MAC tag, and destroys UMDS. The MAC verification confirms ownership of the target page. In this implementation, there is full cryptographic protection in both directions. The system software treats all EPC pages as dirty because evictions always produce new encrypted copies even if the target page is actually clean. In this implementation, the system software cannot take advantage of existing page-replacement algorithms that favor eviction of clean pages over dirty pages.

In another implementation, a restricted EVA page holds UMDSs for pages of the same secure container (e.g., same enclave) and the restricted EVA page is a child of the secure container itself. The processing logic, in response to executing a first instance of the EWBE instruction, produces ciphertext using new version and creates UMDS in the restricted EVA page. The ELDE instruction does not destroy UMDS when loading regular pages (encrypted pages) and replay-protects the UMDS. The processing logic, in response to executing a second instance of the EWBE instruction, verifies that the replay-protected UMDS belongs to the target page and removes the target page without cryptographic protection when the target page is clean. The system software can make better decisions as to which EPC pages to evict based on their clean state. Thus, existing page-replacement algorithms can be easily adapted to handle evictions of EPC pages.

In another embodiment, the processing logic can execute new ENCLS leaf instructions (EMKRVA) to create restricted EVA pages. The restricted EVA pages are associated with SECS pages and the restricted EVA pages contain UMDS with information about evicted pages that belong to the same parent SECS. The EWBE instruction verifies that the target page and a populated EVA slot match if the following conditions are true:

EPCM(REVA).ENCLAVESECS==
EPCM(TARGET).ENCLAVESECS
EPCM(TARGET).
ENCLAVEADDRESS==UMDS.LINADDR

The EPC pages in the EPC and encrypted pages evicted from the EPC can be described by two new attributes in EPCM and UMDS, respectively: Clean (C) and Replay-Protected (RP). For example, EPCM.C represents a target page that is clean (not written to). The clean attribute can be set by ELDE and cleared by CPU on writes to the EPC page. EPCM.RP represents that replay-protected UMDS for this target page exists. The RP attribute can be set by ELDE. The UMDS.C can be used to designate: (1) page in EPC as Clean; (2) evicted page was clean. The UMDS.C can be 1) set by ELDE to replay-protect UMDS and cleared by EWBE using the correct RP-UMDS; and 2) set by EWBE using empty UMDS to evict page whose EPCM.RP=1 (and EPCM.C=1). The UMDS.RP can designate the replay-protected UMDS for this REG page exists and can be set by EWBE using empty UMDS to evict REG page and EPCM.RP=1. The EPCM.C=1 and EPCM.RP=0 is not a valid state. However, UMDS.C=1 and UMDS.RP=0 may be used by ELDE to mark UMDS as RP-UMDS. As described above, this state in UMDS could be made illegal or another bit could be used in the UMDS to indicate that the page is loaded in EPC and this UMDS is replay-protected. Combining these two attributes, C and RP attributes, allows the device to label pages loaded in the EPC and pages evicted from the EPC, such as illustrated and described above with respect to FIGS. 8A-8B.

In another embodiment, after first loading the page in the EPC, the system software allocates an empty REVA slot in case the page will be evicted. The processing logic, in response to a first instance of the first EWBE instruction, encrypts the page with new version and populates the previously empty REVA slot with Legacy UMDS. The system software stores the encrypted copy on disk. When the evicted page is accessed and a page fault (# PF) is triggered, the system software brings the encrypted copy from disk, locates the REVA slot, and executes ELDE. The processing logic, in response to the ELDE instruction, decrypts the page and loads it as Clean RP in the EPC and replay-protects UMDS. The system software preserves the encrypted copy. If the target page is still Clean, the next EWBE instruction can remove it (invalidate) from the EPC and remove RP from UMDS. If the page is written to, the CPU clears its EPCM.C. At this point, the EWBE instruction can encrypt the page with a new version and replace the contents of UMDS. The system software replaces the encrypted page on disk. The system software may be an OS. Alternatively, the system software may be a VMM or hypervisor.

In another embodiment, the VMM implements oversubscription of the EPC to page guest EPC pages regardless of their state. In all cases, the EWBE instruction encrypts the page with new version and saves EPCM.C and EPCM.RP in UMDS. The VMM may use an empty EVA slot. The ELDE instruction decrypts the page, loads it in the EPC, restores EPCM.C and EPCM.RP, and destroys UMDS. UMDS is destroyed when EVA slot (not a REVA slot) is used. UMDS is destroyed when REVA slot is used when RP bit is set. This is to prevent creation of two RP UMDSes that could lead to replay attacks.

In other embodiments, the processing logic can perform other operations to evict and restore secure pages to and from protected memory regions, whether they are enclave pages, EPC pages, or other secure pages in other types of secure containers.

As described herein, the embodiments may reduce a latency of evicting clean secure pages to be close to that of evicting clean non-secure pages. Also, the embodiments described herein allow the system software (OS or VMM) to evict clean secure pages without encryption and may permit the system software to use similar aging algorithms or other page replacement algorithms used for non-secure pages to decide which secure pages in the secure container are better candidates for eviction.

Figure 13A:
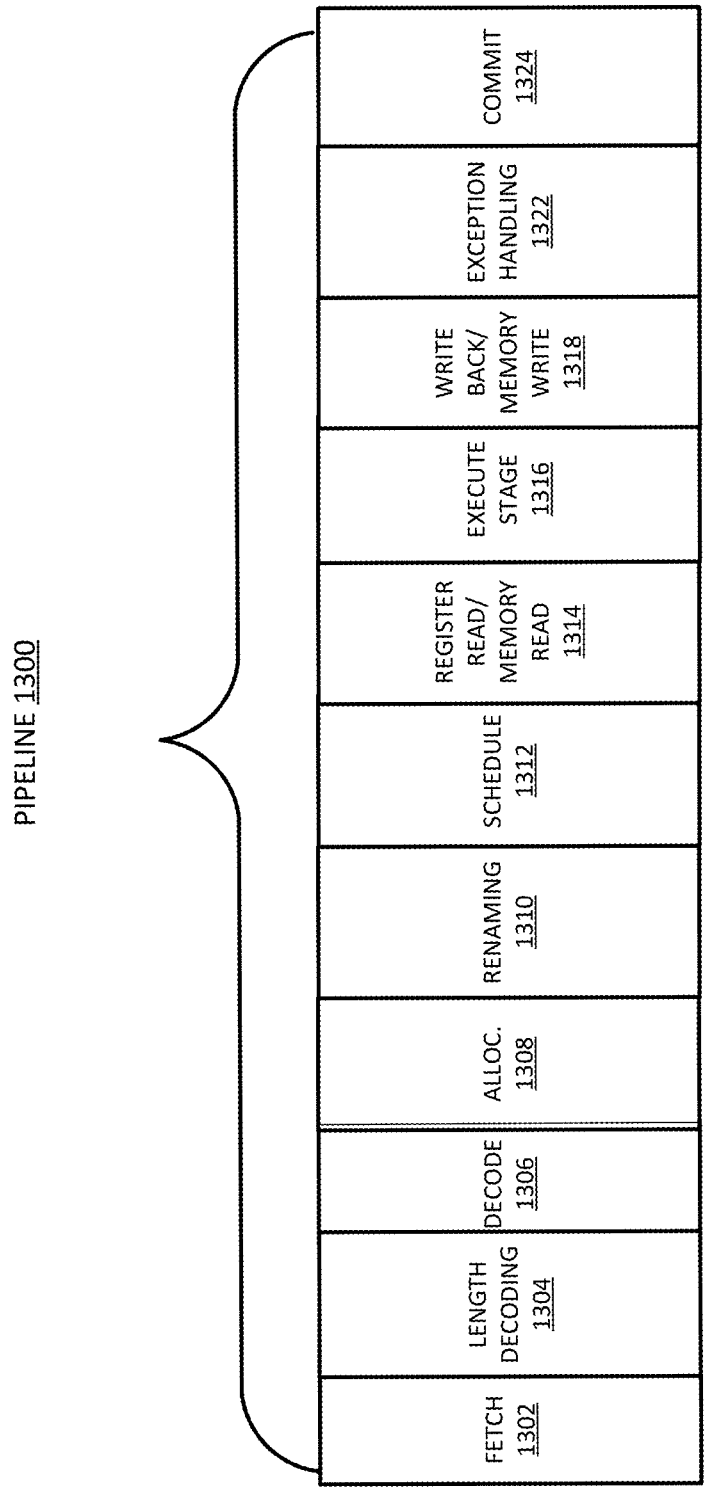
FIG. 13A is a block diagram illustrating a micro-architecture for a processor in which one implementation of the disclosure may be used.
Figure 13B:
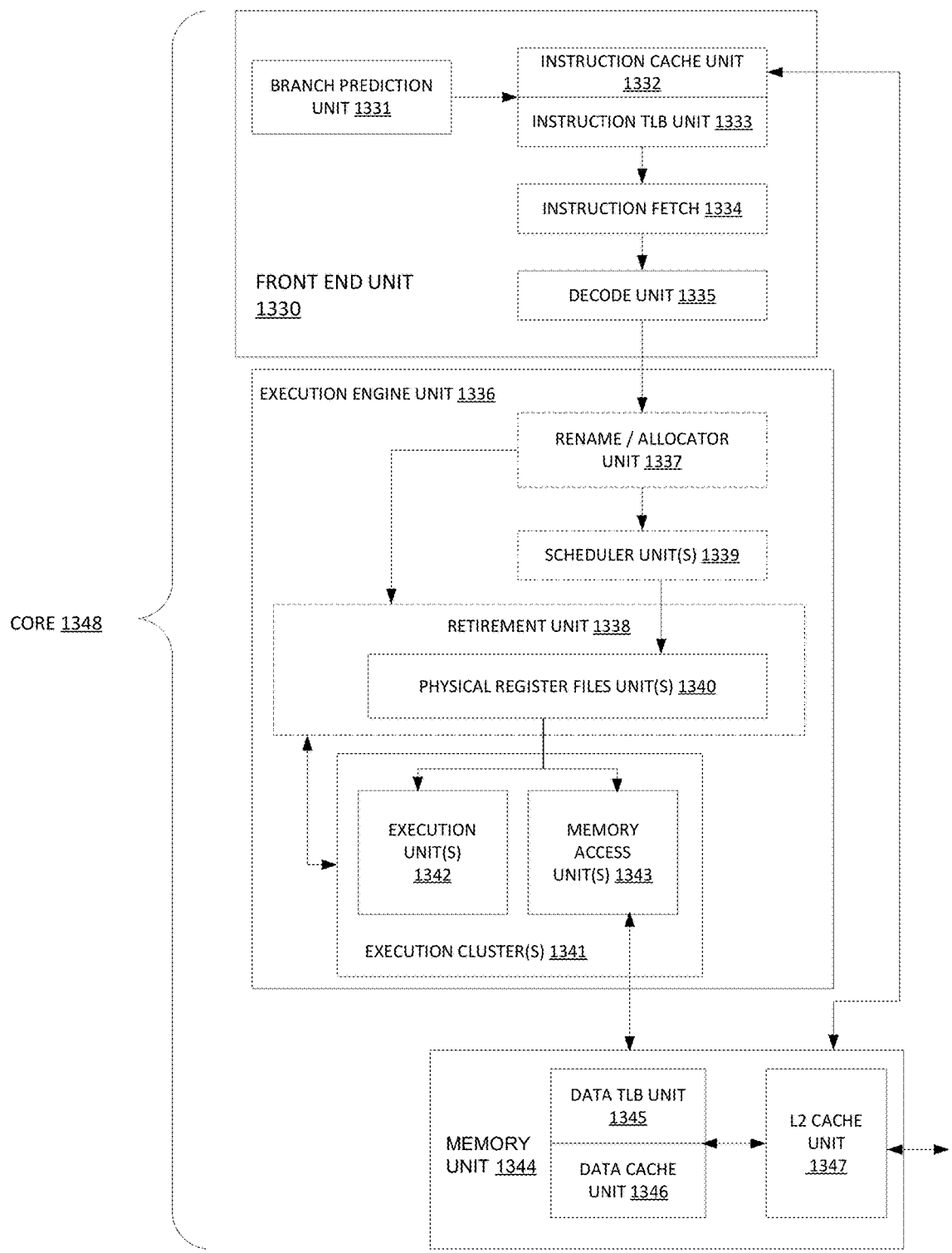
FIG. 13B is a block diagram illustrating an in-order pipeline and a register renaming stage, out-of-order issue/execution pipeline implemented according to at least one implementation of the disclosure.

FIG. 13A is a block diagram illustrating an in-order pipeline and a register renaming stage, out-of-order issue/execution pipeline of a processor according to at least one implementation of the disclosure. FIG. 13B is a block diagram illustrating an in-order architecture core and a register renaming logic, out-of-order issue/execution logic to be included in a processor according to at least one implementation of the disclosure. The solid lined boxes in FIG. 13A illustrate the in-order pipeline, while the dashed lined boxes illustrates the register renaming, out-of-order issue/execution pipeline. Similarly, the solid lined boxes in FIG. 13B illustrate the in-order architecture logic, while the dashed lined boxes illustrates the register renaming logic and out-of-order issue/execution logic.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) schedule stage 1312, a register read/memory read stage 1314, an execute stage 1316, a write back/memory write stage 1318, an exception handling stage 1322, and a commit stage 1324. In some implementations, the stages are provided in a different order and different stages may be considered in-order and out-of-order.

In FIG. 13B, arrows denote a coupling between two or more units and the direction of the arrow indicates a direction of data flow between those units. FIG. 13B shows processor core (core) 1348 including a front end unit 1330 coupled to an execution engine unit 1336, and both are coupled to a memory unit 1344.

The core 1348 may be a reduced instruction set computing (RISC) core, a complex instruction set computing (CISC) core, a very long instruction word (VLIW) core, or a hybrid or alternative core type. As yet another option, the core 1348 may be a special-purpose core, such as, for example, a network or communication core, compression engine, graphics core, or the like.

The front end unit 1330 includes a branch prediction unit 1331 coupled to an instruction cache unit 1332, which is coupled to an instruction translation lookaside buffer (TLB) 1333, which is coupled to an instruction fetch unit 1334, which is coupled to a decode unit 1335. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1332 is further coupled to a level 2 (L2) cache unit 1347 in the memory unit 1344. The decode unit 1335 is coupled to a rename/allocator unit 737 in the execution engine unit 736.

The execution engine unit 1336 includes the rename/allocator unit 1337 coupled to a retirement unit 1338 and a set of one or more scheduler unit(s) 1339. The scheduler unit(s) 1339 represents any number of different schedulers, including reservations stations, central instruction window, etc. The scheduler unit(s) 1339 is coupled to the physical register file(s) unit(s) 1340. Each of the physical register file(s) units 1340 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1340 is overlapped by the retirement unit 1338 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1338 and the physical register file(s) unit(s) 1340 are coupled to the execution cluster(s) 1341. The execution cluster(s) 1341 includes a set of one or more execution units 1342 and a set of one or more memory access units 1343. The execution units 1342 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 1339, physical register file(s) unit(s) 1340, and execution cluster(s) 1341 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 1343). It should also be understood that where separate pipelines are used, one or more of these pipelines may be out-of-order issue/execution and the rest in-order.

The set of memory access units 1343 is coupled to the memory unit 1344, which includes a data TLB unit 1345 coupled to a data cache unit 1346 coupled to a level 2 (L2) cache unit 1347. In one exemplary implementation, the memory access units 1343 may include a load unit, a store address unit, and a store data unit, each of which is coupled to the data TLB unit 1345 in the memory unit 1344. The L2 cache unit 1347 is coupled to one or more other levels of cache and eventually to a main memory.

By way of example, the exemplary register renaming, out-of-order issue/execution core architecture may implement the pipeline 1300 of FIG. 13A as follows: 1) the instruction fetch 38 performs the fetch and length decoding stages 1302 and 1304 respectively; 2) the decode unit 1335 performs the decode stage 1306; 3) the rename/allocator unit 1337 performs the allocation stage 1308 and renaming stage 1310; 4) the scheduler unit(s) 1339 performs the schedule stage 1312; 5) the physical register file(s) unit(s) 1340 and the memory unit 1344 perform the register read/memory read stage 1314; the execution cluster 1341 perform the execute stage 1316; 6) the memory unit 1344 and the physical register file(s) unit(s) 1340 perform the write back/memory write stage 1318; 7) various units may be involved in the exception handling stage 1322) the retirement unit 1338 and the physical register file(s) unit(s) 1340 perform the commit stage 1324.

The core 1348 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 1332/1346 and a shared L2 cache unit 1347, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 14:
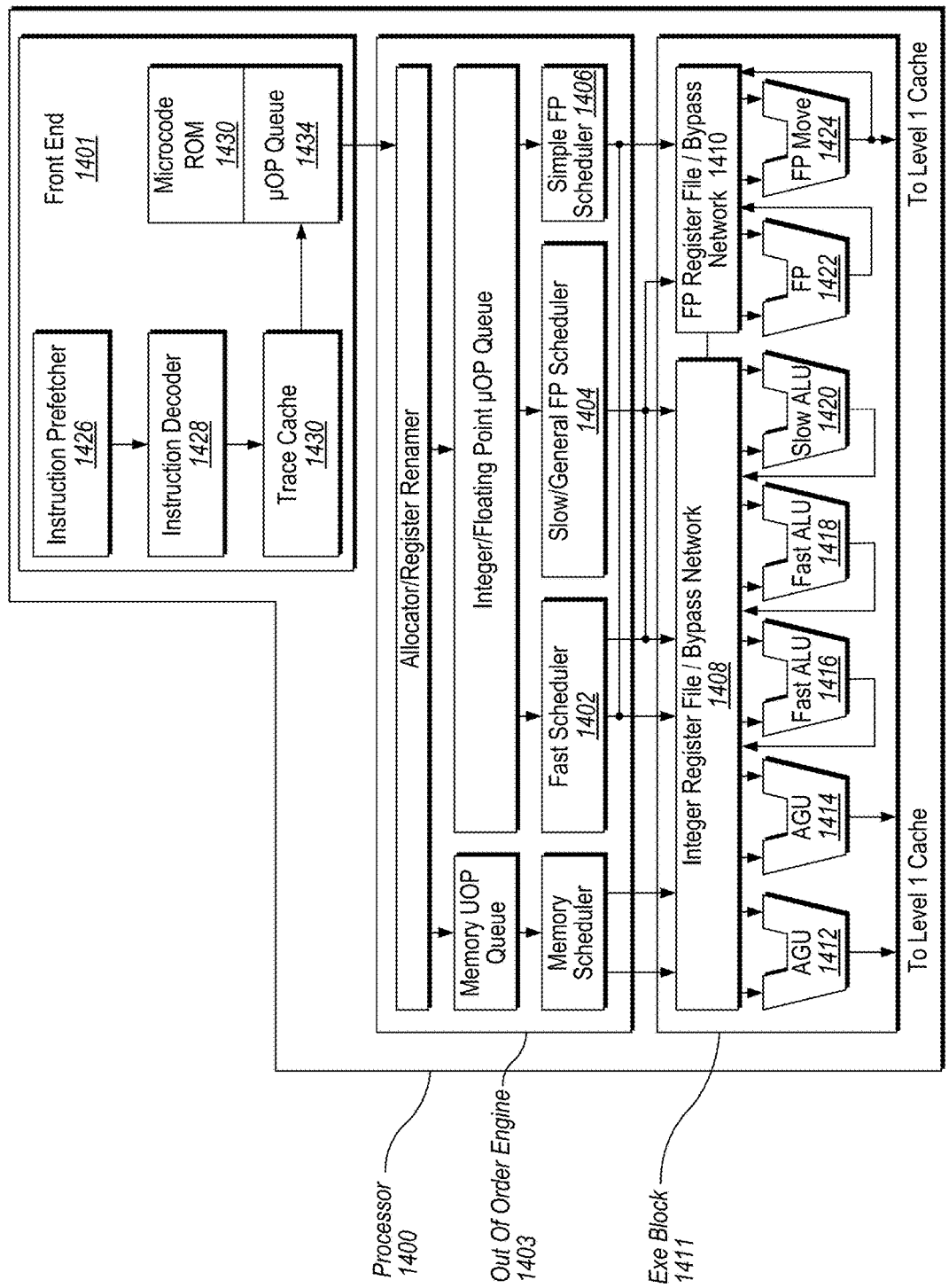
FIG. 14 illustrates a block diagram of the micro-architecture for a processing device that includes logic circuits to perform secure memory repartitioning according to one embodiment.

FIG. 14 illustrates a block diagram of the micro-architecture for a processing device 1400 that includes logic circuits to track and manage a TLB according to one implementation. In some implementations, an instruction can be implemented to operate on data elements having sizes of byte, word, doubleword, quadword, etc., as well as datatypes, such as single and double precision integer and floating point datatypes. In one implementation the in-order front end 1401 is the part of the processing device 1400 that fetches instructions to be executed and prepares them to be used later in the processing device pipeline. The embodiments of the TLB tracking and managing can be implemented in processing device 1350.

The front end 1401 may include several units. In one implementation, the instruction prefetcher 1416 fetches instructions from memory and feeds them to an instruction decoder 1418 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1430 takes decoded uops and assembles them into program ordered sequences or traces in the uop queue 1434 for execution. When the trace cache 1430 encounters a complex instruction, the microcode ROM 1432 provides the uops needed to complete the operation.

Some instructions are converted into a single micro-op, whereas others need several micro-ops to complete the full operation. In one implementation, if more than four micro-ops are needed to complete an instruction, the decoder 1418 accesses the microcode ROM 1432 to do the instruction. For one implementation, an instruction can be decoded into a small number of micro ops for processing at the instruction decoder 1418. In another implementation, an instruction can be stored within the microcode ROM 1432 should a number of micro-ops be needed to accomplish the operation. The trace cache 1430 refers to an entry point programmable logic array (PLA) to determine a correct micro-instruction pointer for reading the micro-code sequences to complete one or more instructions in accordance with one implementation from the micro-code ROM 1432. After the microcode ROM 1432 finishes sequencing micro-ops for an instruction, the front end 1401 of the machine resumes fetching micro-ops from the trace cache 1430.

The out-of-order execution engine 1403 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations, and one for non-memory operations, in front of the instruction schedulers: memory scheduler, fast scheduler 1402, slow/general floating point scheduler 1404, and simple floating point scheduler 1406. The uop schedulers 1402, 1404, 1406, determine when a uop is ready to execute based on the readiness of their dependent input register operand sources and the availability of the execution resources the uops need to complete their operation. The fast scheduler 1402 of one implementation can schedule on each half of the main clock cycle while the other schedulers can only schedule once per main processing device clock cycle. The schedulers arbitrate for the dispatch ports to schedule uops for execution.

Register files 1408, 1410, sit between the schedulers 1402, 1404, 1406, and the execution units 1412, 1414, 1416, 1418, 1410, 1412, 1414 in the execution block 1411. There is a separate register file 1408, 1410, for integer and floating point operations, respectively. Each register file 1408, 1410, of one implementation also includes a bypass network that can bypass or forward just completed results that have not yet been written into the register file to new dependent uops. The integer register file 1408 and the floating point register file 1410 are also capable of communicating data with the other. For one implementation, the integer register file 1408 is split into two separate register files, one register file for the low order 32 bits of data and a second register file for the high order 32 bits of data. The floating point register file 1410 of one implementation has 128 bit wide entries because floating point instructions typically have operands from 64 to 128 bits in width.

The execution block 1411 contains the execution units 1412, 1414, 1416, 1418, 1410, 1412, 1414, where the instructions are actually executed. This section includes the register files 1408, 1410, that store the integer and floating point data operand values that the micro-instructions need to execute. The processing device 1400 of one implementation is comprised of a number of execution units: address generation unit (AGU) 1412, AGU 1414, fast ALU 1416, fast ALU 1418, slow ALU 1410, floating point ALU 1412, floating point move unit 1414. For one implementation, the floating point execution blocks 1412, 1414, execute floating point, MMX, SIMD, and SSE, or other operations. The floating point ALU 1412 of one implementation includes a 64 bit by 64 bit floating point divider to execute divide, square root, and remainder micro-op s. For implementations of the disclosure, instructions involving a floating point value may be handled with the floating point hardware.

In one implementation, the ALU operations go to the high-speed ALU execution units 1416, 1418. The fast ALUs 1416, 1418, of one implementation can execute fast operations with an effective latency of half a clock cycle. For one implementation, most complex integer operations go to the slow ALU 1410 as the slow ALU 1410 includes integer execution hardware for long latency type of operations, such as a multiplier, shifts, flag logic, and branch processing. Memory load/store operations are executed by the AGUs 1412, 1414. For one implementation, the integer ALUs 1416, 1418, 1410, are described in the context of performing integer operations on 64 bit data operands. In alternative implementations, the ALUs 1416, 1418, 1410, can be implemented to support a variety of data bits including 16, 32, 128, 256, etc. Similarly, the floating point units 1412, 1414, can be implemented to support a range of operands having bits of various widths. For one implementation, the floating point units 1412, 1414, can operate on 128 bits wide packed data operands in conjunction with SIMD and multimedia instructions.

In one implementation, the uops schedulers 1402, 1404, 1406, dispatch dependent operations before the parent load has finished executing. As uops are speculatively scheduled and executed in processing device 1400, the processing device 1400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 1400 also includes logic to track and manage the TLB according to one implementation. In one implementation, the execution block 1411 of processing device 1400 may include TDRM 180, MOT 160, TDCS 124, and TDTCS 128 to provide track and manage the TLB, according to the description herein.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microproces sing devices enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 15:
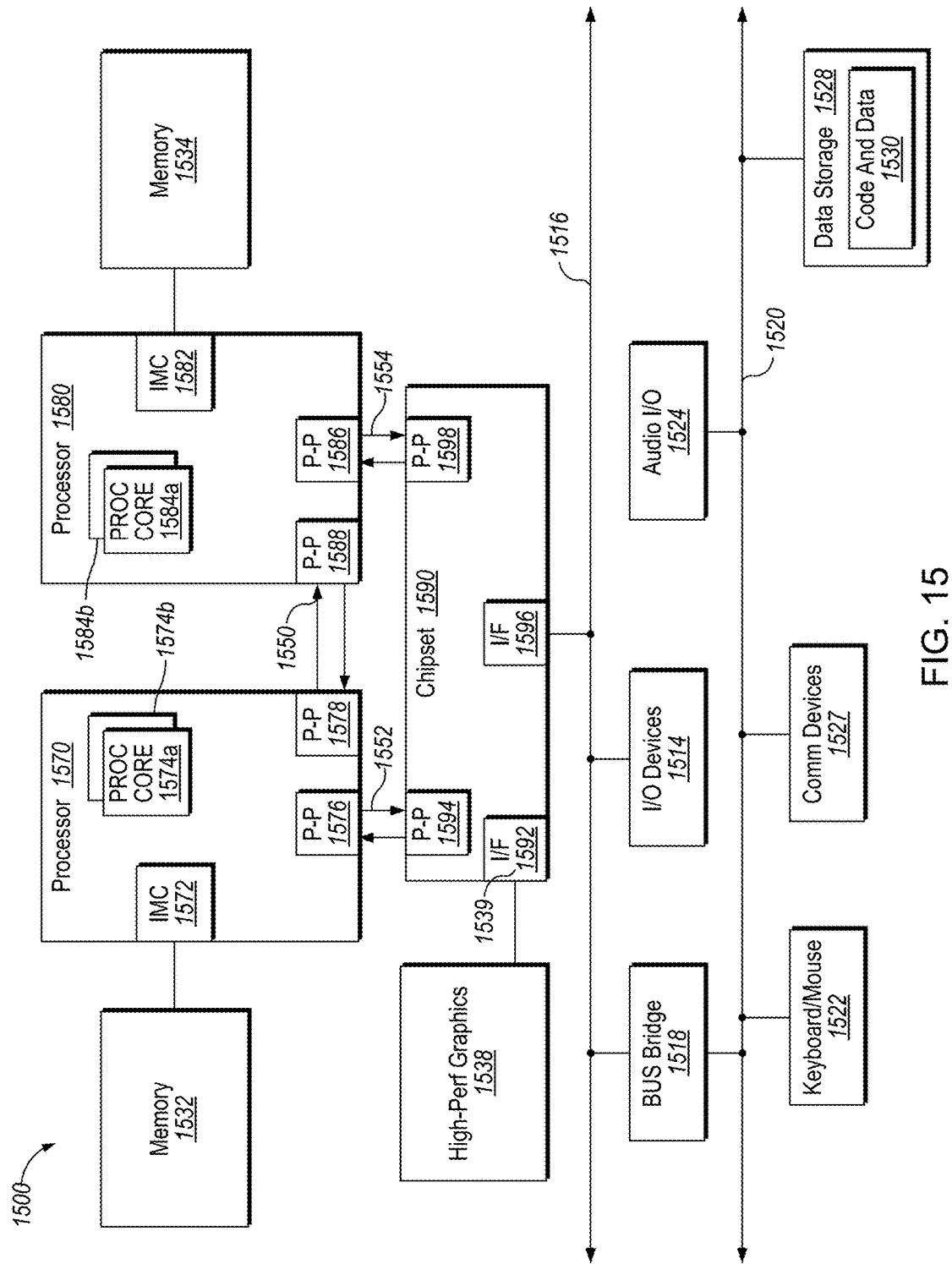
FIG. 15 is a block diagram of a computer system according to one implementation.

Embodiments may be implemented in many different system types. Referring now to FIG. 15, shown is a block diagram of a multiprocessing device system 1500 in accordance with an implementation. As shown in FIG. 15, multiprocessing device system 1500 is a point-to-point interconnect system, and includes a first processing device 1570 and a second processing device 1580 coupled via a point-to-point interconnect 1550. As shown in FIG. 15, each of processing devices 1570 and 1580 may be multicore processing devices, including first and second processing device cores (not shown), although potentially many more cores may be present in the processing devices. The processing devices each may include hybrid write mode logics in accordance with an implementation of the present. The implementations of the tracking and managing the TLB can be implemented in the processing device 1570, processing device 1580, or both.

While shown with two processing devices 1570, 1580, it is to be understood that the scope of the disclosure is not so limited. In other implementations, one or more additional processing devices may be present in a given processing device.

Processing devices 1570 and 1580 are shown including integrated memory controller units 1572 and 1582, respectively. Processing device 1570 also includes as part of its bus controller units point-to-point (P-P) interfaces 1576 and 1578; similarly, second processing device 1580 includes P-P interfaces 1586 and 1588. Processing devices 1570, 1580 may exchange information via a point-to-point (P-P) interface 1550 using P-P interface circuits 1578, 1588. As shown in FIG. 15, IMCs 1572 and 1582 couple the processing devices to respective memories, namely a memory 1532 and a memory 1534, which may be portions of main memory locally attached to the respective processing devices.

Processing devices 1570, 1580 may each exchange information with a chipset 1590 via individual P-P interfaces 1552, 1554 using point to point interface circuits 1576, 1594, 1586, 1598. Chipset 1590 may also exchange information with a high-performance graphics circuit 1538 via a high-performance graphics interface 1539.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 1590 may be coupled to a first bus 1516 via an interface 1596. In one implementation, first bus 1516 may be a Peripheral Component Interconnect (PCI) bus, or a bus such as a PCI Express bus or another third generation I/O interconnect bus, although the scope of the disclosure is not so limited.

As shown in FIG. 15, various I/O devices 1514 may be coupled to first bus 1516, along with a bus bridge 1518 which couples first bus 1516 to a second bus 1520. In one implementation, second bus 1520 may be a low pin count (LPC) bus. Various devices may be coupled to second bus 1520 including, for example, a keyboard and/or mouse 1522, communication devices 1527 and a storage unit 1528 such as a disk drive or other mass storage device which may include instructions/code and data 1530, in one implementation. Further, an audio I/O 1524 may be coupled to second bus 1520. Note that other architectures are possible. For example, instead of the point-to-point architecture of FIG. 15, a system may implement a multi-drop bus or other such architecture.

Figure 16:
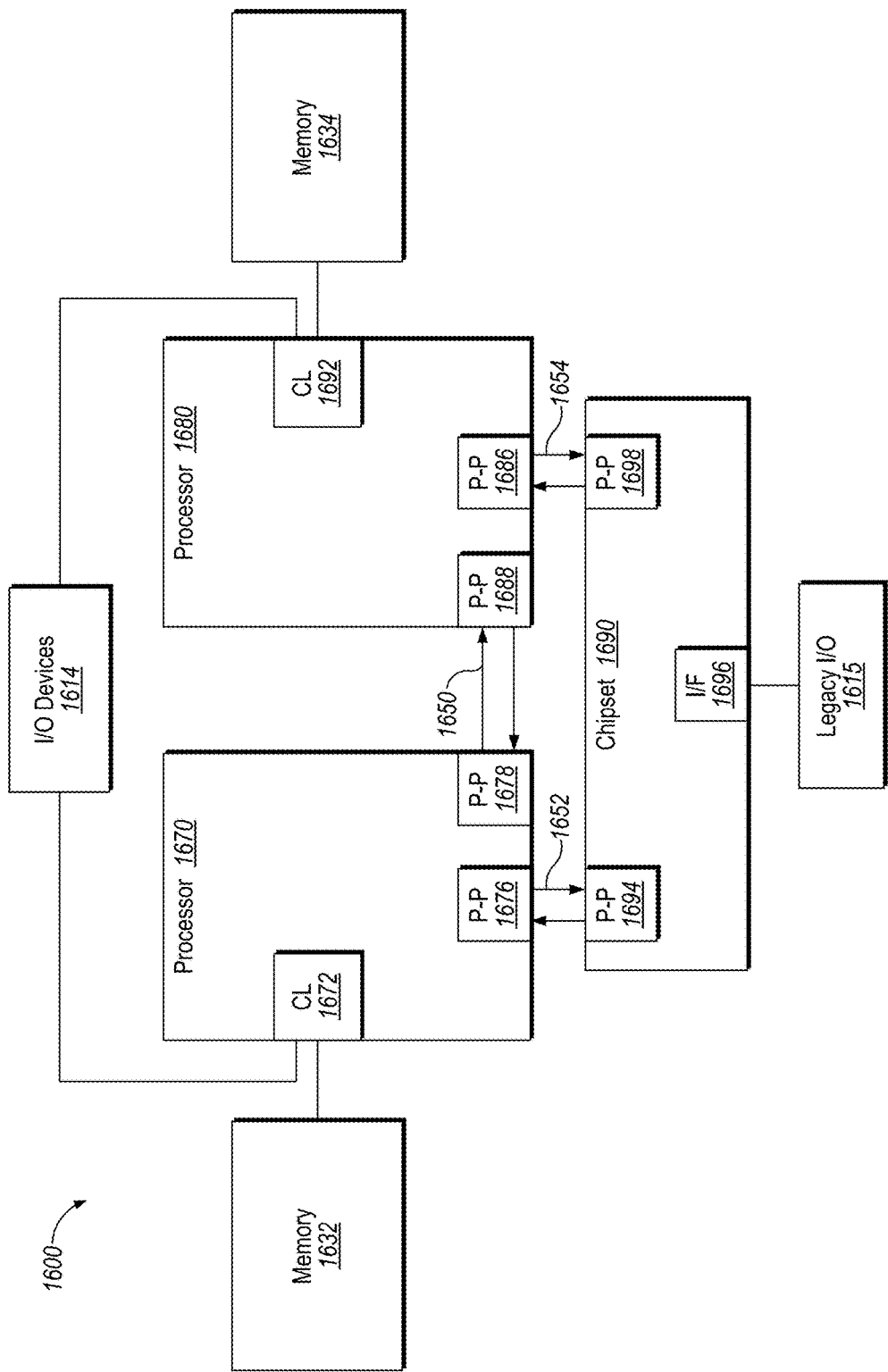
FIG. 16 is a block diagram of a computer system according to another implementation.

Referring now to FIG. 16, shown is a block diagram of a third system 1600 in accordance with an implementation of the disclosure. Like elements in FIGS. 15 and 16 bear like reference numerals and certain aspects of FIG. 15 have been omitted from FIG. 16 in order to avoid obscuring other aspects of FIG. 16.

FIG. 16 illustrates that the processing devices 1570, 1580 may include integrated memory and I/O control logic ("CL") 1572 and 1582, respectively. For at least one implementation, the CL 1572, 1582 may include integrated memory controller units such as described herein. In addition. CL 1572, 1582 may also include I/O control logic. FIG. 15 illustrates that the memories 1532, 1534 are coupled to the CL 1572, 1582, and that I/O devices 1614 are also coupled to the control logic 1572, 1582. Legacy I/O devices 1615 are coupled to the chipset 1590. The implementations of the tracking and managing the TLB can be implemented in processing device 1570, processing device 1580, or both.

Figure 17:
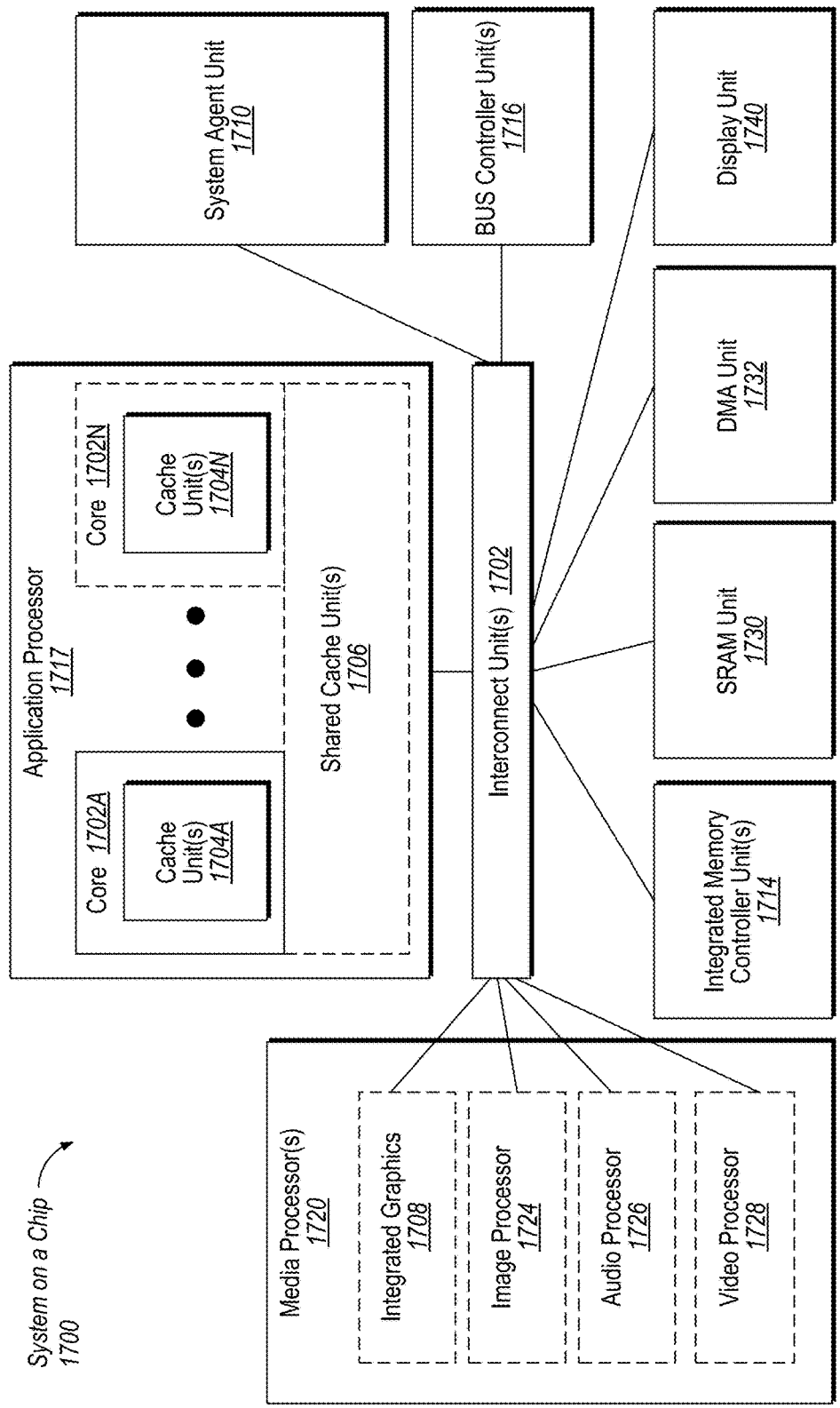
FIG. 17 is a block diagram of a system-on-a-chip according to one implementation.

FIG. 17 is an example system on a chip (SoC) that may include one or more of the cores 1702. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 17, shown is a block diagram of a SoC 1700 in accordance with an implementation of the disclosure. Also, dashed lined boxes are features on more advanced SoCs. In FIG. 17, an interconnect unit(s) 1702 is coupled to: an application processing device 1710 which includes a set of one or more cores 1702A-N and shared cache unit(s) 1706; a system agent unit 1712; a bus controller unit(s) 1716; an integrated memory controller unit(s) 1714; a set or one or more media processing devices 1720 which may include integrated graphics logic 1708, an image processing device 1724 for providing still and/or video camera functionality, an audio processing device 1726 for providing hardware audio acceleration, and a video processing device 1728 for providing video encode/decode acceleration; a static random access memory (SRAM) unit 1730; a direct memory access (DMA) unit 1732; and a display unit 1740 for coupling to one or more external displays. The implementations of the tracking and managing the TLB can be implemented in SoC 1700.

Figure 18:
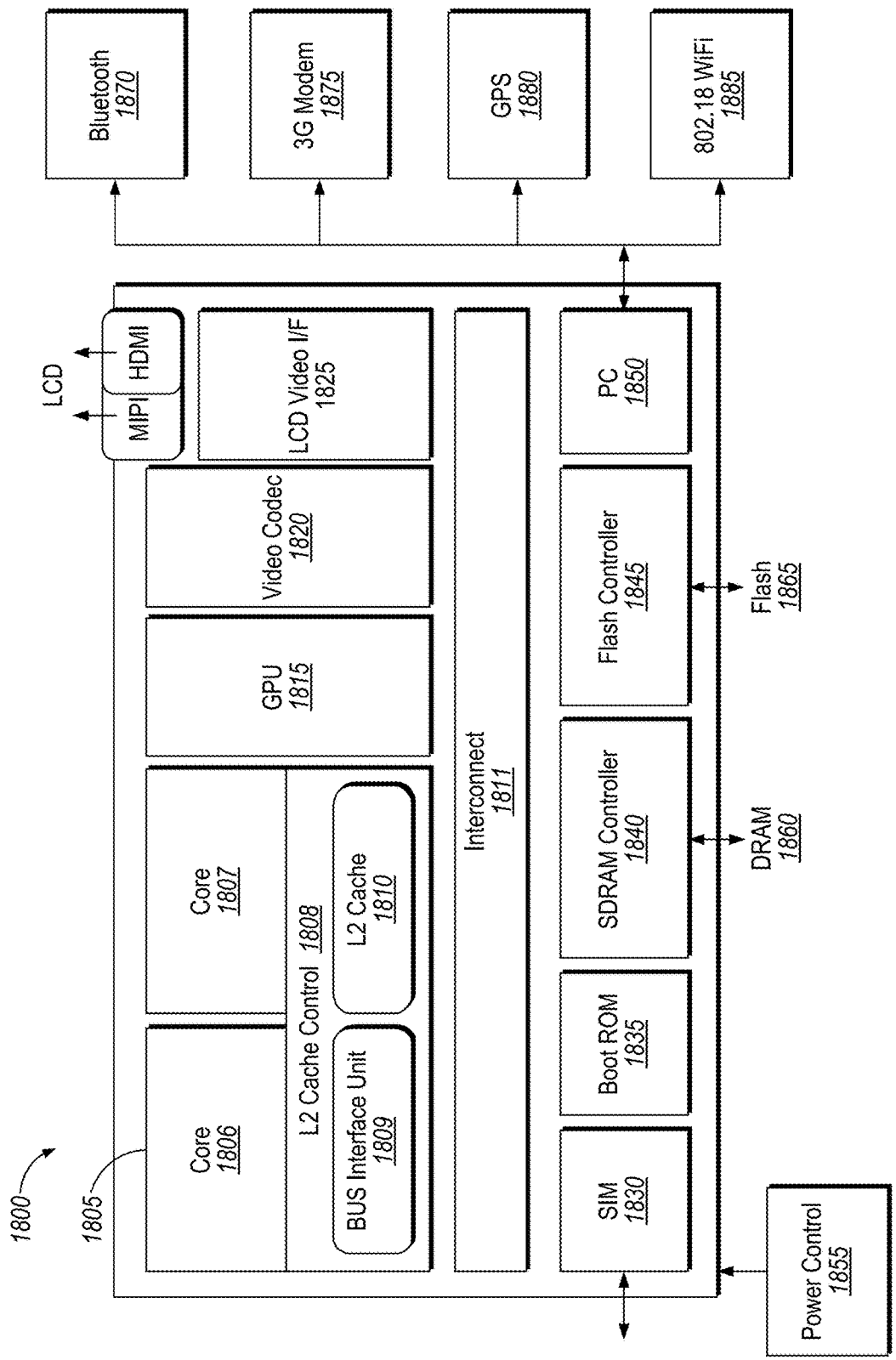
FIG. 18 illustrates another implementation of a block diagram for a computing system.

Turning next to FIG. 18, an implementation of an SoC design in accordance with implementations of the disclosure is depicted. As an illustrative example, SoC 1800 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the tracking and managing the TLB can be implemented in SoC 1800.

Here, SoC 1820 includes 2 cores—1806 and 1807. Similar to the discussion above, cores 1806 and 1807 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1806 and 1807 are coupled to cache control 1808 that is associated with bus interface unit 1809 and L2 cache 1810 to communicate with other parts of system 1800. Interconnect 1811 includes an on-chip interconnect, such as an IOSF, AMBA, or other interconnects discussed above, which can implement one or more aspects of the described disclosure.

Interconnect 1811 provides communication channels to the other components, such as a Subscriber Identity Module (SIM) 1830 to interface with a SIM card, a boot ROM 1835 to hold boot code for execution by cores 1806 and 1807 to initialize and boot SoC 1800, a SDRAM controller 1840 to interface with external memory (e.g. DRAM 1860), a flash controller 1845 to interface with non-volatile memory (e.g. Flash 1865), a peripheral control 1850 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the implementations described herein.

In addition, the system illustrates peripherals for communication, such as a Bluetooth module 1870, 3G modem 1875, GPS 1880, and Wi-Fi 1885. Note as stated above, a UE includes a radio for communication. As a result, these peripheral communication modules may not all be included. However, in a UE some form of a radio for external communication should be included.

Figure 19:
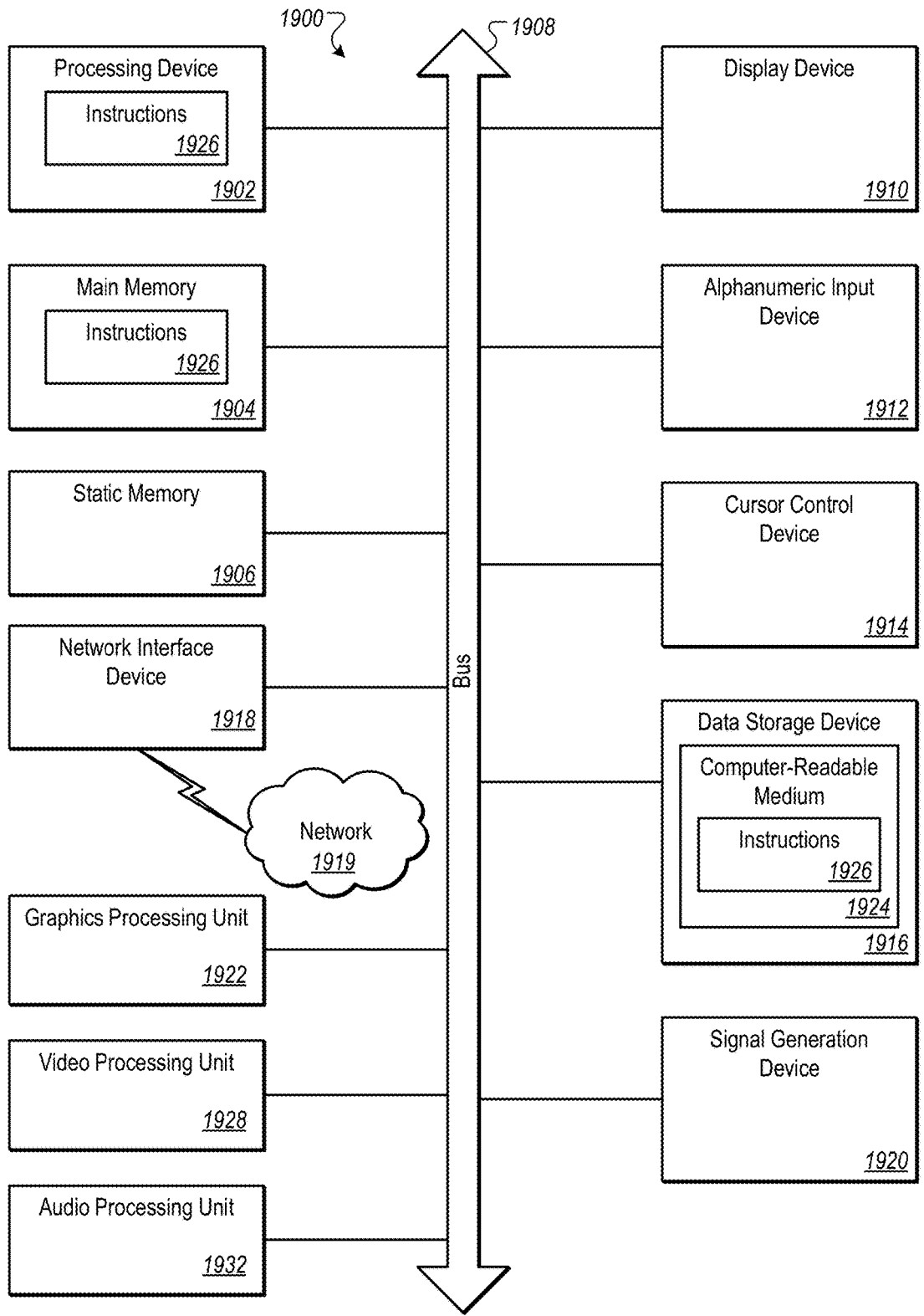
FIG. 19 illustrates another implementation of a block diagram for a computing system.

FIG. 19 illustrates a diagrammatic representation of a machine in the example form of a computing system 1900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1900.

The computing system 1900 includes a processing device 1902, main memory 1904 (e.g., read-only memory (ROM), flash memory, dynamic random access memory (DRAM) (such as synchronous DRAM (SDRAM) or DRAM (RDRAM), etc.), a static memory 1906 (e.g., flash memory, static random access memory (SRAM), etc.), and a data storage device 1918, which communicate with each other via a bus 1930.

Processing device 1902 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microproces sing device, or processing device implementing other instruction sets, or processing devices implementing a combination of instruction sets. Processing device 1902 may also be one or more special-purpose processing devices such as an application specific integrated circuit (ASIC), a field programmable gate array (FPGA), a digital signal processing device (DSP), network processing device, or the like. In one implementation, processing device 1902 may include one or processing device cores. The processing device 1902 is configured to execute the processing logic 1926 for performing the operations discussed herein. In one implementation, processing device 1902 can be part of the computing system 100 of FIG. 1. Alternatively, the computing system 1900 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1900 may further include a network interface device 1908 communicably coupled to a network 1920. The computing system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), a signal generation device 1916 (e.g., a speaker), or other peripheral devices. Furthermore, computing system 1900 may include a graphics processing unit 1922, a video processing unit 1928 and an audio processing unit 1932. In another implementation, the computing system 1900 may include a chipset (not illustrated), which refers to a group of integrated circuits, or chips, that are designed to work with the processing device 1902 and controls communications between the processing device 1902 and external devices. For example, the chipset may be a set of chips on a motherboard that links the processing device 1902 to very high-speed devices, such as main memory 1904 and graphic controllers, as well as linking the processing device 1902 to lower-speed peripheral buses of peripherals, such as USB, PCI or ISA buses.

The data storage device 1918 may include a computer-readable storage medium 1924 on which is stored software 1926 embodying any one or more of the methodologies of functions described herein. The software 1926 may also reside, completely or at least partially, within the main memory 1904 as instructions 1926 and/or within the processing device 1902 as processing logic 1926 during execution thereof by the computing system 1900; the main memory 1904 and the processing device 1902 also constituting computer-readable storage media.

The computer-readable storage medium 1924 may also be used to store instructions 1926 utilizing the processing device 1902, such as described with respect to FIG. 1, and/or a software library containing methods that call the above applications. While the computer-readable storage medium 1924 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

In order to reduce the pressure on vector registers, it is possible to extend the instruction set of the architecture hardware, as accomplished by embodiments disclosed herein, to enable operations with respect to the instructions described herein, such as the EWBE instruction. The instruction may include immediate (constant) values. For a further example, some approaches in other vector instruction set architectures (ISAs), such as X86 and ARM vector ISAs, requires extra registers to hold the constant values and/or to read them directly from memory, resulting in cumbersome code that also consumes registers.

Embodiments disclosed herein modify a processor instruction set architecture, such as an x86 or an ARM architecture, to extend the capabilities of a EWBE instruction.

Disclosed embodiments of operations allow more sources than a current EWBE instruction. Disclosed embodiments of vector operations also allow immediate (constant) operands.

Disclosed embodiments of vector operations further can handle non-repetitive, frequently occurring vector constants involving strided values.

In some embodiments, extended versions of the "EWBE" instructions and other vector instructions that allow multiple sources, multiple destinations, and immediates.

Figure 20:
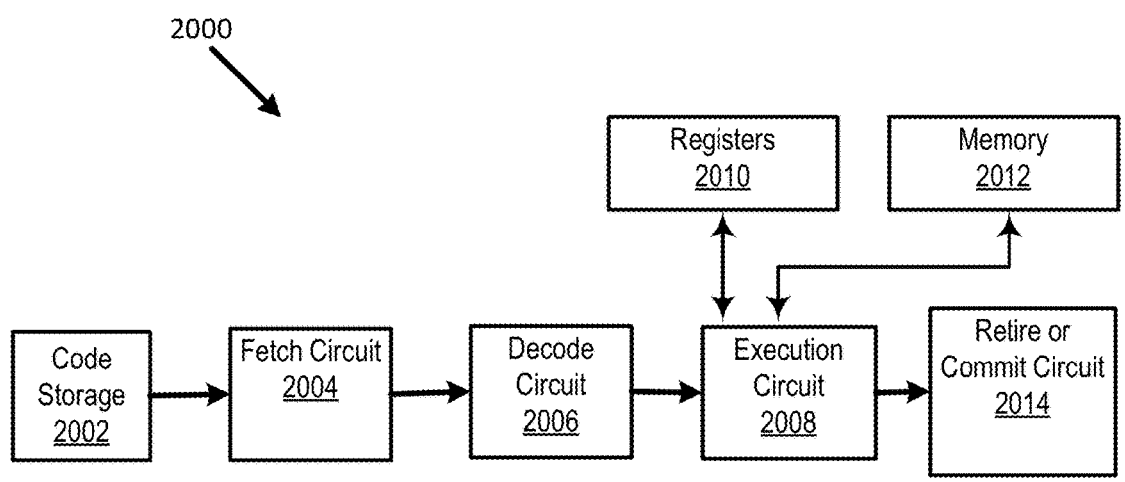
FIG. 20 is a block diagram illustrating processing components for executing instructions vector operations with constant values, according to some embodiments.

FIG. 20 is a block diagram illustrating processing components for executing instructions operations with or without constant values (an immediate), according to some embodiments. As shown, computing system 2000 includes code storage 2002, fetch circuit 2004, decode circuit 2006, execution circuit 2008, registers 2010, memory 2012, and retire or commit circuit 2014. In operation, an instruction is to be fetched by fetch circuit 2004 from code storage 2002, which may comprise a cache memory, an on-chip memory, a memory on the same die as the processor, an instruction register, a general register, or system memory, without limitation. In one embodiment, the instruction has a format similar to that of instruction 2200 in FIG. 22. After fetching the instruction from code storage 2002, decode circuit 2006 decodes the fetched instruction, including by parsing the various fields of the instruction. After decoding the fetched instruction, execution circuit 2008 is to execute the decoded instruction. Several exemplary embodiments of the execution circuit 2008 are illustrated and described with respect to the figures. In performing the step of executing the instruction, execution circuit 2008 may read data from and write data to registers 2010 and memory 2012. Registers 2010 may include a data register, an instruction register, a vector register, a mask register, a general register, an on-chip memory, a memory on the same die as the processor, or a memory in the same package as the processor, without limitation. Memory 2012 may include an on-chip memory, a memory on the same die as the processor, a memory in the same package as the processor, a cache memory, or system memory, without limitation. After the execution circuit executes the instruction, retire or commit circuit 2014 may retire the instruction, ensuring that execution results are written to or have been written to their destinations, and freeing up or releasing resources for later use.

Figure 21:
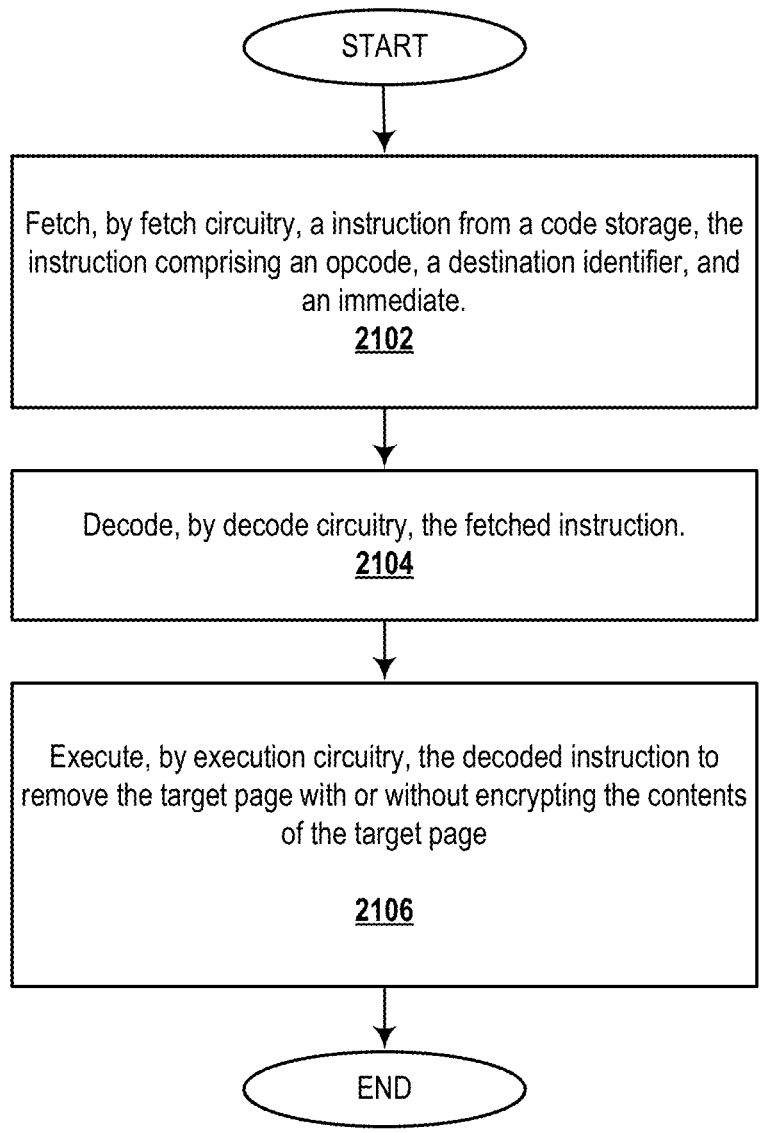
FIG. 21 is a flow diagram of a process to be performed by a processor to execute a vector instruction for a vector operation with constant values.

FIG. 21 is a flow diagram of a process to be performed by a processor to execute a instruction for a operation with constant values (an immediate). After starting the process, a fetch circuit at 2102 is to fetch the instruction from a code storage, the instruction including an opcode, a destination identifier, and an optional immediate. At 2104, a decode circuit is to decode the fetched instruction. At 2106, an execution circuit is to execute the decoded instruction to remove the target page with or without encrypting the contents of the target page, as described herein. The instruction may be a vector instruction in some scenarios.

Figure 22:
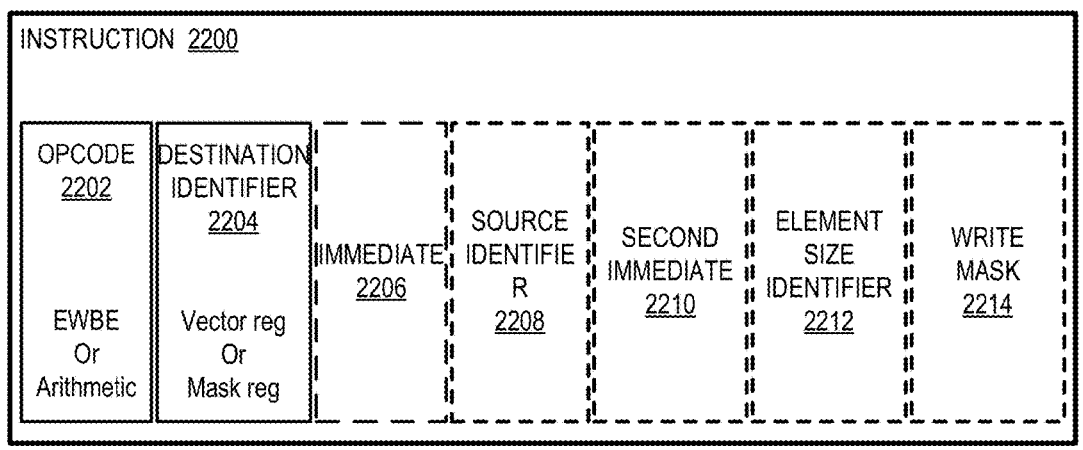
FIG. 22 is a block diagram illustrating a format for instructions for a vector operation with constant values, according to some embodiments.

FIG. 22 is a block diagram illustrating a format for instructions for a vector operation with constant values (an immediate), according to some embodiments. As shown, instruction 2200 includes opcode 2202, destination identifier 2204, optional immediate 2206, optional source identifier 2208 (optional instruction fields are shown in a box with dashed outline), optional second immediate 2210, optional element size identifier 2212, and optional writemask 2214.

Opcode 2202 in some embodiments is EWBE. In some other embodiments, opcode 2202 is an arithmetic operation, such as ADD, SUB, DIV, MUL, MOD, etc. Some examples of different opcodes are discussed and illustrated below with respect to the figures.

Destination identifier 22 in some embodiments is to specify a vector register, such as one of the vector registers provided in a processor's register file. In some embodiments, destination identifier is to specify a mask register, such as one of the mask registers provided in the processor's register file.

Optional source identifier 2208, in some embodiments, is to specify a source vector register, such as the vector registers included in a processor's register file. In some embodiments, optional source identifier 2208 is to identify a general purpose register included in the processor's register file. In some embodiments, source identifier 2208 is to identify a memory location Optional second immediate 2210 is included in some embodiments of vector operations with immediate values, for example.

Optional element size identifier 2212, in some embodiments, is included in the opcode, such as a prefix or suffix, "B," "W," "D," and "Q," corresponding to a size-1 byte, 2 bytes, 4 bytes, or 8 bytes, respectively—of each destination vector element. In some embodiments, optional size identifier 2212 is included in the opcode, such as a prefix or suffix, "H," "S," "D," "Q," and "E," corresponding to precision levels—Half precision (2 bytes), Single precision (4 bytes), Double precision (8 bytes), and Quadruple precision (16 bytes), respectively—of each destination vector element. In other embodiments, optional size identifier 2212 is an instruction parameter or operand specifying the destination vector elements' size and/or precision level.

In some embodiments, optional writemask 2214 is a multi-bit operand, with each bit controlling whether a corresponding element of the destination vector is to be masked. In some embodiments, optional writemask 2214 is to identify a writemask register among the processor's register file, such as, for example, write mask registers. In some embodiments, if an element of the destination vector is masked, it retains the value it had before execution of the vector instruction. In some embodiments, if an element of the destination vector is masked, it is set to zero when the vector instruction is executed. If an element of the destination vector is not masked, it is set to the value resulting from execution of the vector instruction.

The following examples pertain to further embodiments.

Example 1 is a processing device comprising: a processing core; and a memory controller coupled between the processor core and a memory device, wherein the processor core, in response to a secure write back (EWBE) instruction to evict a target page from a protected region of memory into a non-protected region of the memory, is to: check a first attribute of a secure page cache map to determine whether the target page is clean; check a second attribute of the secure page cache map to determine whether the target page is replay protected by a unified version-paging data structure; check the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and remove the target page from the protected region of memory without encrypting the contents of the target page when the first attribute indicates that the target page is clean, the target page is replay protected by the secure page cache map and the unified version-paging data structure contains the information for the target page.

In Example 2, the processing device of Example 1, the unified version-paging data structure is a unified meta-data structure (UMDS) that stores the version meta-data and the page meta-data.

In Example 3, the processing device of Example 1, the processing core, in response to the EWBE instruction, is to access an extended version array (EVA) stored in the protected region, the EVA comprising a plurality of EVA slots, wherein a first EVA slot of the plurality of EVA slots stores the unified version-paging data structure, wherein the first EVA slot is to store a unified meta-data structure (UMDS), wherein the UMDS is the unified version-paging data structure.

In Example 4, the processing device of Example 1, the processing core, in response to the EWBE instruction, is to access a restricted extended version array (REVA) stored in the protected region, the REVA comprising a plurality of REVA slots, wherein a first REVA slot of the plurality of EVA slots stores the unified version-paging data structure, wherein the first REVA slot is to store a unified meta-data structure (UMDS), wherein the UMDS is the unified version-paging data structure.

In Example 5, the processing device of Example 4, the UMDS comprises: the version meta-data; a linear address; and a message-authentication code (MAC) tag.

In Example 6, the processing device of Example 1, the protected memory region is an enclave page cache (EPC), wherein the target page is an EPC page stored in the EPC, wherein the EPC stores an extended version array (EVA) page having a EVA slot to store the unified version-paging data structure, wherein the EWBE instruction comprises at least the following parameters: a pointer to the EPC page, a pointer to the EVA slot to store meta-data, and a pointer to a location in the non-protected region of the memory to store an encrypted page.

In Example 7, the processing device of Example 1, the target page is an enclave page cache (EPC) page, wherein the protected region is an EPC, wherein the secure page cache map is an enclave page cache map (EPCM), wherein the processing core, in response to a first instance of the EWBE instruction for the EPC page, is to: remove the EPC page from the EPC; populate the EVA slot with the version meta-data; encrypt the EPC page with the version meta-data to obtain the encrypted page; write the encrypted page to the location in the non-protected region of the memory; and write the version meta-data corresponding to the EPC page and the page meta-data to the unified version-paging data structure in the EVA slot.

In Example 8, the processing device of Example 7, the processing core, to populate the EVA slot with the version meta-data, is to: create a nonce corresponding to a page version; and store the nonce in the EVA slot.

In Example 9, the processing device of Example 6, the processing core, in response to a secure load (ELDE) instruction to restore the encrypted page, is to: verify and decrypt the encrypted page using the version meta-data stored at the EVA slot to obtain a decrypted page; and identify and populate a free EPC page in the EPC with the decrypted page.

In Example 10, the processing device of Example 9, the ELDE instruction comprises at least the following parameters: the location in the non-protected region of the memory where the encrypted page is stored; a pointer to the free EPC page in the EPC, security information for the free EPC page, and the pointer to the EVA slot that stores the version meta-data.

In Example 1, the processing device of Example 9, the processing core, in response to the ELDE instruction, is further to: populate a field with an address of a security information page; and make the EVA slot available for subsequent version meta-data of another EPC page to be evicted.

In Example 12, the processing device of Example 1, the protected memory region is an enclave page cache (EPC), wherein the target page is an EPC page stored in the EPC, wherein the EPC stores a restricted extended version array (REVA) page having a REVA slot to store the unified version-paging data structure, wherein the EWBE instruction comprises at least the following parameters: a pointer to the EPC page, a pointer to the EVA slot to store meta-data, and a pointer to a location in the non-protected region of the memory to store an encrypted page, wherein the target page is an enclave page cache (EPC) page, wherein the protected region is an EPC, wherein the secure page cache map is an enclave page cache map (EPCM), wherein the processing core, in response to a first instance of the EWBE instruction for the EPC page, is to: remove the EPC page from the EPC; populate the REVA slot with the version meta-data by creating a nonce corresponding to a page version and storing the nonce in the REVA slot; encrypt the EPC page with the version meta-data to obtain the encrypted page; write the encrypted page to the location in the non-protected region of the memory; and write the version meta-data corresponding to the EPC page and the page meta-data to the unified version-paging data structure in the REVA slot.

Various embodiments may have different combinations of the structural features described above. For instance, all optional features of the processors and methods described above may also be implemented with respect to a system described herein and specifics in the examples may be used anywhere in one or more embodiments.

Example 15 is a method comprising: executing, via a processing device, a secure write back (EWBE) instruction to evict a target page from a protected region of memory into a non-protected region of the memory; responsive to the executing the EWBE instruction, checking a first attribute of a secure page cache map to determine whether the target page is clean; checking a second attribute of the secure page cache map to determine whether the target page is replay protected by a unified version-paging data structure; checking the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and removing the target page from the protected region of memory without encrypting the contents of the target page when the first attribute indicates that the target page is clean and the target page is replay protected by the unified version-paging data structure.

In Example 14, the method of Example 13, executing the EWBE instruction further comprises access an extended version array (EVA) stored in the protected region, the EVA comprising a plurality of EVA slots, wherein a first EVA slot of the plurality of EVA slots stores the unified version-paging data structure.

In Example 15, the method of Example 14, executing the EWBE instruction further comprises storing a unified meta-data structure (UMDS) in the first EVA slot, wherein the UMDS is the unified version-paging data structure, wherein the UMDS comprises: the version meta-data; a linear address; and a message-authentication code (MAC) tag.

In Example 16, the method of Example 14, the target page is an enclave page cache (EPC) page, wherein the protected region is an EPC, wherein executing the EWBE instruction further comprises: remove the EPC page from the EPC; populate the EVA slot with the version meta-data; encrypt the EPC page with the version meta-data to obtain the encrypted page; write the encrypted page to a location in the non-protected region of the memory; and write the version meta-data corresponding to the EPC page and the page meta-data to the unified version-paging data structure in the EVA slot.

In Example 17, the method of Example 14, further comprises: executing a secure load (ELDE) instruction, via the processing device, to restore the encrypted page; responsive to the executing the ELDE instruction, verifying and decrypt the encrypted page using the version meta-data stored at the EVA slot to obtain a decrypted page; and identifying and populating a free EPC page in the EPC with the decrypted page.

Various embodiments may have different combinations of the structural features described above. For instance, all optional features of the processors and methods described above may also be implemented with respect to a system described herein and specifics in the examples may be used anywhere in one or more embodiments.

Example 7 is a system comprising: a memory device comprising a protected region of memory in which enclave page cache (EPC) stores EPC pages and a unified version-paging data structure, the unified version-paging data structure comprising version meta-data and page meta-data corresponding to a first EPC page; and a processing device operably coupled to the memory device, the processing device to: execute a secure write back (EWBE) instruction to evict the first EPC page from the EPC into a non-protected region of the memory device; responsive to the EWBE instruction, check a clean bit of an enclave page cache map (EPCM) to determine whether the first EPC page is clean; check a replay-protected bit of the EPCM to determine whether the first EPC page is replay protected by the unified version-paging data structure; check whether the unified version-paging data structure contains information that matches the target page; and remove the first EPC page from the EPC without encrypting the contents of the first EPC page when the clean bit indicates that the first EPC page is clean and the first EPC page is replay protected by the unified version-paging data structure.

In Example 19, the system of Example 18, the processing device, responsive to the EWBE instruction, is further to access an extended version array (EVA) stored in the EPC, the EVA comprising a plurality of EVA slots, wherein a first EVA slot of the plurality of EVA slots stores the unified version-paging data structure, wherein the first EVA slot is to store a unified meta-data structure (UMDS), wherein the UMDS is the unified version-paging data structure.

In Example 20, the system of Example 19, the UMDS comprises: the version meta-data; a linear address; and a message-authentication code (MAC) tag.

Various embodiments may have different combinations of the structural features described above. For instance, all optional features of the processors and methods described above may also be implemented with respect to an integrated circuit described herein and specifics in the examples may be used anywhere in one or more embodiments.

In example 21, an integrated circuit comprises a memory device to store pages; a processing device operably coupled to the memory device; and a memory controller coupled between the processing device and the memory device, wherein the processing device, in response to a secure write back (EWBE) instruction to evict a target page from a protected region of memory into a non-protected region of the memory, is to: check a first attribute of a secure page cache map to determine whether the target page is clean; check a second attribute of the secure page cache map to determine whether the target page is replay protected by a unified version-paging data structure; check the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and remove the target page from the protected region of memory without encrypting the contents of the target page when the first attribute indicates that the target page is clean, the target page is replay protected by the secure page cache map and the unified version-paging data structure contains the information for the target page.

In Example 22, the integrated circuit of Example 21, the unified version-paging data structure is a unified meta-data structure (UMDS) that stores the version meta-data and the page meta-data.

In Example 23, the integrated circuit of Example 21, the processing core, in response to the EWBE instruction, is to access an extended version array (EVA) stored in the protected region, the EVA comprising a plurality of EVA slots, wherein a first EVA slot of the plurality of EVA slots stores the unified version-paging data structure, wherein the first EVA slot is to store a unified meta-data structure (UMDS), wherein the UMDS is the unified version-paging data structure.

In Example 24, the integrated circuit of Example 21, the processing core, in response to the EWBE instruction, is to access a restricted extended version array (REVA) stored in the protected region, the REVA comprising a plurality of REVA slots, wherein a first REVA slot of the plurality of EVA slots stores the unified version-paging data structure, wherein the first REVA slot is to store a unified meta-data structure (UMDS), wherein the UMDS is the unified version-paging data structure.

In Example 25, the integrated circuit of Example 24, the UMDS comprises: the version meta-data; a linear address; and a message-authentication code (MAC) tag.

In Example 26, the integrated circuit of Example 21, the protected memory region is an enclave page cache (EPC), wherein the target page is an EPC page stored in the EPC, wherein the EPC stores an extended version array (EVA) page having a EVA slot to store the unified version-paging data structure, wherein the EWBE instruction comprises at least the following parameters: a pointer to the EPC page, a pointer to the EVA slot to store meta-data, and a pointer to a location in the non-protected region of the memory to store an encrypted page.

In Example 27, the integrated circuit of Example 26, the target page is an enclave page cache (EPC) page, wherein the protected region is an EPC, wherein the secure page cache map is an enclave page cache map (EPCM), wherein the processing core, in response to a first instance of the EWBE instruction for the EPC page, is to: remove the EPC page from the EPC; populate the EVA slot with the version meta-data; encrypt the EPC page with the version meta-data to obtain the encrypted page; write the encrypted page to the location in the non-protected region of the memory; and write the version meta-data corresponding to the EPC page and the page meta-data to the unified version-paging data structure in the EVA slot.

In Example 28, the integrated circuit of Example 27, the processing core, to populate the EVA slot with the version meta-data, is to: create a nonce corresponding to a page version; and store the nonce in the EVA slot.

In Example 29, the integrated circuit of Example 26, the processing core, in response to a secure load (ELDE) instruction to restore the encrypted page, is to: verify and decrypt the encrypted page using the version meta-data stored at the EVA slot to obtain a decrypted page; and identify and populate a free EPC page in the EPC with the decrypted page.

In Example 30, the integrated circuit of Example 29, the ELDE instruction comprises at least the following parameters: the location in the non-protected region of the memory where the encrypted page is stored; a pointer to the free EPC page in the EPC, security information for the free EPC page, and the pointer to the EVA slot that stores the version meta-data.

In Example 31, the integrated circuit of Example 29, the processing core, in response to the ELDE instruction, is further to: populate a field with an address of a security information page; and make the EVA slot available for subsequent version meta-data of another EPC page to be evicted.

In Example 32, the integrated circuit of Example 21, the protected memory region is an enclave page cache (EPC), wherein the target page is an EPC page stored in the EPC, wherein the EPC stores a restricted extended version array (REVA) page having a REVA slot to store the unified version-paging data structure, wherein the EWBE instruction comprises at least the following parameters: a pointer to the EPC page, a pointer to the EVA slot to store meta-data, and a pointer to a location in the non-protected region of the memory to store an encrypted page, wherein the target page is an enclave page cache (EPC) page, wherein the protected region is an EPC, wherein the secure page cache map is an enclave page cache map (EPCM), wherein the processing core, in response to a first instance of the EWBE instruction for the EPC page, is to: remove the EPC page from the EPC; populate the REVA slot with the version meta-data by creating a nonce corresponding to a page version and storing the nonce in the REVA slot; encrypt the EPC page with the version meta-data to obtain the encrypted page; write the encrypted page to the location in the non-protected region of the memory; and write the version meta-data corresponding to the EPC page and the page meta-data to the unified version-paging data structure in the REVA slot.

Various embodiments may have different combinations of the structural features described above. For instance, all optional features of the processors and methods described above may also be implemented with respect to an apparatus described herein.

In Example 33, an apparatus for evicting secure pages comprises: means for checking a first attribute of a secure page cache map to determine whether a target page is clean; means for checking a second attribute of the secure page cache map to determine whether the target page is replay protected by a unified version-paging data structure; means for checking the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and means for removing the target page from the protected region of memory without encrypting the contents of the target page when the first attribute indicates that the target page is clean, the target page is replay protected by the secure page cache map and the unified version-paging data structure contains the information for the target page.

In Example 34, a system for evicting secure pages comprises: a processing core; a memory controller coupled between the processor core and a memory device, wherein the processor core is to: check a first attribute of a secure page cache map to determine whether the target page is clean; check a second attribute of the secure page cache map to determine whether the target page is replay protected by a unified version-paging data structure; check the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and remove the target page from the protected region of memory without encrypting the contents of the target page when the first attribute indicates that the target page is clean, the target page is replay protected by the secure page cache map and the unified version-paging data structure contains the information for the target page.

In Example 35, the system of Example 34 may include the subject matter of any of Examples 1-33.

In Example 36, an apparatus comprises a memory device and a processing device coupled to the memory device, and the processing device comprises the subject matter of Examples 1-12, or the subject matter of Examples 18-35.

In Example 37, an apparatus comprises a memory device and a processing device coupled to the memory device, and the processing device is to perform comprises the method of Examples 13-17.

In Example 38, a non-transitory machine-readable storage medium including instructions that, when executed by a processing device, cause the processing device to: check a first attribute of a secure page cache map to determine whether the target page is clean; check a second attribute of the secure page cache map to determine whether the target page is replay protected by a unified version-paging data structure; check the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and remove the target page from the protected region of memory without encrypting the contents of the target page when the first attribute indicates that the target page is clean, the target page is replay protected by the secure page cache map and the unified version-paging data structure contains the information for the target page.

In Example 39, the non-transitory machine-readable storage medium of Example 38, the processing device is further to perform the method of Examples 13-17.

In Example 40, a non-transitory machine-readable storage medium including instructions that, when executed by a processing device, cause the processing device to perform the method of Examples 13-17.

While the disclosure has been described with respect to a limited number of embodiments, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The embodiments are described with reference to TLB tracking and managing in specific integrated circuits, such as in computing platforms or microprocessing devices. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processing device, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processing device or machine that performs data manipulations. However, the disclosure is not limited to processing devices or machines that perform 512 bit, 256 bit, 128 bit, 64 bit, 32 bit, or 16 bit data operations and can be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of embodiments of the disclosure rather than to provide an exhaustive list of all possible implementations of embodiments of the disclosure.

Although the below examples describe instruction handling and distribution in the context of execution units and logic circuits, other embodiments of the disclosure can be accomplished by way of a data or instructions stored on a machine-readable, tangible medium, which when performed by a machine cause the machine to perform functions consistent with at least one embodiment of the disclosure. In one embodiment, functions associated with embodiments of the disclosure are embodied in machine-executable instructions. The instructions can be used to cause a general-purpose or special-purpose processing device that is programmed with the instructions to perform the steps of the disclosure. Embodiments of the disclosure may be provided as a computer program product or software which may include a machine or computer-readable medium having stored thereon instructions which may be used to program a computer (or other electronic devices) to perform one or more operations according to embodiments of the disclosure. Alternatively, operations of embodiments of the disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
   a processing core; and
   a memory controller coupled between the processing core and a memory device, wherein the processing core, in response to a secure write back (EWBE) instruction to evict a target page from a protected region of memory into a non-protected region of the memory, is to:
      check a first attribute of a secure page cache map to determine whether the target page is clean;
      check a second attribute of the secure page cache map to determine whether the target page is replay protected by a unified version-paging data structure;
      check the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and
      remove the target page from the protected region of memory without encrypting the contents of the target page when the first attribute indicates that the target page is clean, the target page is replay protected by the secure page cache map and the unified version-paging data structure contains the information for the target page.

2. The processing device of claim 1, wherein the unified version-paging data structure is a unified meta-data structure (UMDS) that stores the version meta-data and the page meta-data.

3. The processing device of claim 1, wherein the processing core, in response to the EWBE instruction, is to access an extended version array (EVA) stored in the protected region, the EVA comprising a plurality of EVA slots, wherein a first EVA slot of the plurality of EVA slots stores the unified version-paging data structure, wherein the first EVA slot is to store a unified meta-data structure (UMDS), wherein the UMDS is the unified version-paging data structure.

4. The processing device of claim 1, wherein the processing core, in response to the EWBE instruction, is to access a restricted extended version array (REVA) stored in the protected region, the REVA comprising a plurality of REVA slots, wherein a first REVA slot of the plurality of REVA slots stores the unified version-paging data structure, wherein the first REVA slot is to store a unified meta-data structure (UMDS), wherein the UMDS is the unified version-paging data structure.

5. The processing device of claim 4, wherein the UMDS comprises:
   the version meta-data;
   a linear address; and
   a message-authentication code (MAC) tag.

6. The processing device of claim 1, wherein the protected memory region is an enclave page cache (EPC), wherein the target page is an EPC page stored in the EPC, wherein the EPC stores an extended version array (EVA) page having a EVA slot to store the unified version-paging data structure, wherein the EWBE instruction comprises at least the following parameters: a pointer to the EPC page, a pointer to the EVA slot to store meta-data, and a pointer to a location in the non-protected region of the memory to store an encrypted page.

7. The processing device of claim 6, wherein the target page is an enclave page cache (EPC) page, wherein the protected region is an EPC, wherein the secure page cache map is an enclave page cache map (EPCM), wherein the processing core, in response to a first instance of the EWBE instruction for the EPC page, is to:
  remove the EPC page from the EPC;
  populate the EVA slot with the version meta-data;
  encrypt the EPC page with the version meta-data to obtain the encrypted page;
  write the encrypted page to the location in the non-protected region of the memory; and
  write the version meta-data corresponding to the EPC page and the page meta-data to the unified version-paging data structure in the EVA slot.

8. The processing device of claim 7, wherein the processing core, to populate the EVA slot with the version meta-data, is to:
  create a nonce corresponding to a page version; and
  store the nonce in the EVA slot.

9. The processing device of claim 6, wherein the processing core, in response to a secure load (ELDE) instruction to restore the encrypted page, is to:
  verify and decrypt the encrypted page using the version meta-data stored at the EVA slot to obtain a decrypted page; and
  identify and populate a free EPC page in the EPC with the decrypted page.

10. The processing device of claim 9, wherein the ELDE instruction comprises at least the following parameters:
  the location in the non-protected region of the memory where the encrypted page is stored;
  a pointer to the free EPC page in the EPC;
  security information for the free EPC page; and
  the pointer to the EVA slot that stores the version meta-data.

11. The processing device of claim 9, wherein the processing core, in response to the ELDE instruction, is further to:
  populate a field with an address of a security information page; and
  make the EVA slot available for subsequent version meta-data of another EPC page to be evicted.

12. The processing device of claim 1, wherein the protected memory region is an enclave page cache (EPC), wherein the target page is an EPC page stored in the EPC, wherein the EPC stores a restricted extended version array (REVA) page having a REVA slot to store the unified version-paging data structure, wherein the EWBE instruction comprises at least the following parameters: a pointer to the EPC page, a pointer to the REVA slot to store meta-data, and a pointer to a location in the non-protected region of the memory to store an encrypted page, wherein the target page is an enclave page cache (EPC) page, wherein the protected region is an EPC, wherein the secure page cache map is an enclave page cache map (EPCM), wherein the processing core, in response to a first instance of the EWBE instruction for the EPC page, is to:
  remove the EPC page from the EPC;
  populate the REVA slot with the version meta-data by creating a nonce corresponding to a page version and storing the nonce in the REVA slot;
  encrypt the EPC page with the version meta-data to obtain the encrypted page;
  write the encrypted page to the location in the non-protected region of the memory; and
  write the version meta-data corresponding to the EPC page and the page meta-data to the unified version-paging data structure in the REVA slot.

13. A method, comprising:
  executing, via a processing device, a secure write back (EWBE) instruction to evict a target page from a protected region of memory into a non-protected region of the memory;
  responsive to the executing the EWBE instruction,
    checking a first attribute of a secure page cache map to determine whether the target page is clean;
    checking a second attribute of the secure page cache map to determine whether the target page is replay protected by a unified version-paging data structure;
    checking the unified version-paging data structure to determine whether the unified version-paging data structure contains information that matches the target page, wherein the unified version-paging data structure is stored in the protected region of memory and comprises version meta-data corresponding to the target page and page meta-data to restore the target page to the protected region; and
    removing the target page from the protected region of memory without encrypting the contents of the target page when the first attribute indicates that the target page is clean and the target page is replay protected by the unified version-paging data structure.

14. The method of claim 13, wherein executing the EWBE instruction further comprises access an extended version array (EVA) stored in the protected region, the EVA comprising a plurality of EVA slots, wherein a first EVA slot of the plurality of EVA slots stores the unified version-paging data structure.

15. The method of claim 14, wherein executing the EWBE instruction further comprises storing a unified meta-data structure (UMDS) in the first EVA slot, wherein the UMDS is the unified version-paging data structure, wherein the UMDS comprises:
  the version meta-data;
  a linear address; and
  a message-authentication code (MAC) tag.

16. The method of claim 14, wherein the target page is an enclave page cache (EPC) page, wherein the protected region is an EPC, wherein executing the EWBE instruction further comprises:
  remove the EPC page from the EPC;
  populate the EVA slot with the version meta-data;
  encrypt the EPC page with the version meta-data to obtain the encrypted page;
  write the encrypted page to a location in the non-protected region of the memory; and
  write the version meta-data corresponding to the EPC page and the page meta-data to the unified version-paging data structure in the EVA slot.

17. The method of claim 14, further comprising:
executing a secure load (ELDE) instruction, via the processing device, to restore the encrypted page;
responsive to the executing the ELDE instruction,
- verifying and decrypt the encrypted page using the version meta-data stored at the EVA slot to obtain a decrypted page; and
- identifying and populating a free EPC page in the EPC with the decrypted page.

18. A system comprising:
a memory device comprising a protected region of memory in which enclave page cache (EPC) stores EPC pages and a unified version-paging data structure, the unified version-paging data structure comprising version meta-data and page meta-data corresponding to a first EPC page; and
a processing device operably coupled to the memory device, the processing device to:
- execute a secure write back (EWBE) instruction to evict the first EPC page from the EPC into a non-protected region of the memory device;
- responsive to the EWBE instruction,
  - check a clean bit of an enclave page cache map (EPCM) to determine whether the first EPC page is clean;
  - check a replay-protected bit of the EPCM to determine whether the first EPC page is replay protected by the unified version-paging data structure;
  - check whether the unified version-paging data structure contains information that matches the first EPC page; and
  - remove the first EPC page from the EPC without encrypting the contents of the first EPC page when the clean bit indicates that the first EPC page is clean and the first EPC page is replay protected by the unified version-paging data structure.

19. The system of claim 18, wherein the processing device, responsive to the EWBE instruction, is further to access an extended version array (EVA) stored in the EPC, the EVA comprising a plurality of EVA slots, wherein a first EVA slot of the plurality of EVA slots stores the unified version-paging data structure, wherein the first EVA slot is to store a unified meta-data structure (UMDS), wherein the UMDS is the unified version-paging data structure.

20. The system of claim 19, wherein the UMDS comprises:
the version meta-data;
a linear address; and
a message-authentication code (MAC) tag.

* * * * *